US008588227B2

(12) United States Patent
Lee et al.

(10) Patent No.: US 8,588,227 B2
(45) Date of Patent: *Nov. 19, 2013

(54) RECURSIVE HEADER COMPRESSION FOR RELAY NODES

(75) Inventors: Jiwoong Lee, Berkeley, CA (US); Fatih Ulupinar, San Diego, CA (US); Xiaolong Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

This patent is subject to a terminal disclaimer.

(21) Appl. No.: 12/789,311

(22) Filed: May 27, 2010
(Under 37 CFR 1.47)

(65) Prior Publication Data

US 2011/0128908 A1 Jun. 2, 2011

Related U.S. Application Data

(60) Provisional application No. 61/226,455, filed on Jul. 17, 2009.

(51) Int. Cl.
*H04L 12/28* (2006.01)
*H04J 3/18* (2006.01)
*G06F 15/16* (2006.01)

(52) U.S. Cl.
USPC ............ 370/389; 370/393; 370/477; 709/247

(58) Field of Classification Search
None
See application file for complete search history.

(56) References Cited

U.S. PATENT DOCUMENTS

| | | | | |
|---|---|---|---|---|
| 7,948,913 | B1 * | 5/2011 | Dinan | 370/252 |
| 2004/0001508 | A1 * | 1/2004 | Zheng et al. | 370/466 |
| 2008/0144555 | A1 | 6/2008 | Hong et al. | |
| 2009/0109924 | A1 * | 4/2009 | Sato | 370/331 |
| 2009/0245382 | A1 * | 10/2009 | Ekman | 375/240.24 |

FOREIGN PATENT DOCUMENTS

EP 1122925 A1 8/2001

OTHER PUBLICATIONS

International Search Report and Written Opinion—PCT/US2010/042435, International Search Authority—European Patent Office—Nov. 5, 2010.

* cited by examiner

*Primary Examiner* — Yemane Mesfin
*Assistant Examiner* — Christine Duong
(74) *Attorney, Agent, or Firm* — Linda G. Gunderson

(57) ABSTRACT

Systems and methodologies are described that facilitate compressing multiple headers in wireless communication networks that utilize relay nodes. Relay nodes and/or other access points can insert headers in packets related to routing the packets. The multiple headers can be compressed at a transmitter and decompressed at a receiver to save bandwidth over a radio interface. Recursive compression and/or decompression can be utilized at least in part by recursively calling a compression/decompression engine or context, such that no modification is required of the engine or context. The recursive compression/decompression can compress and/or decompress packet headers until a certain type of header is reached (or a certain type of header is no longer found in the packet), according to a tunnel depth, according to newly defined compression and/or decompress profiles, and/or the like.

54 Claims, 17 Drawing Sheets

RECURSIVE HEADER COMPRESSION FOR RELAY NODES

CLAIM OF PRIORITY UNDER 35 U.S.C. §119

The present Application for Patent claims priority to Provisional Application No. 61/226,455 entitled "SYSTEMS AND METHODS OF RECURSIVE HEADER COMPRESSION FOR LTE RELAY" filed Jul. 17, 2009, and assigned to the assignee hereof and hereby expressly incorporated by reference herein.

BACKGROUND

1. Field

The following description relates generally to wireless communications, and more particularly to routing data packets among multiple access points.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. Access points, however, can be limited in geographic coverage area as well as resources such that mobile devices near edges of coverage and/or devices in areas of high traffic can experience degraded quality of communications from an access point.

Relay nodes can be provided to expand network capacity and coverage area by facilitating communication between mobile devices and access points. For example, a relay node can establish a backhaul link with a donor access point, which can provide access to a number of other relay nodes, and the relay node can establish an access link with one or more mobile devices or additional relay nodes. Thus, there can be multiple relay nodes in a communications path between a mobile device and access point. In certain relay node configurations (e.g., for internet protocol (IP) relay nodes), each relay node can add a header to a received packet to facilitate routing the received packet among the various relay nodes and/or among core network components. Similarly, a given responding packet can include various headers to be processed at each relay node to route the packet to a device related to the received packet. The various headers result in additional data transmitted between each node in a communications path, which can impact data throughput in the wireless network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating recursively compressing and decompressing headers of packets transmitted across one or more relay nodes to save radio resources by reducing packet overhead created by the multiple headers. For example, a compression engine, such as a robust header compression (RoHC) engine, can be recursively operated at a transmitter to compress multiple headers of a packet related to routing the packet among the one or more relay nodes. Similarly, a decompression engine, such as a RoHC engine, can be recursively operated at a receiver to decompress each compressed header of a packet for processing and routing the packet to a related relay node or device. In this regard, the compressed headers are communicated among the one or more relay nodes (and/or other devices) to save radio resources.

According to related aspects, a method is provided that includes receiving a packet including a plurality of headers and compressing a portion of the plurality of headers at least in part by recursively using a compression context to create a plurality of compressed headers each corresponding to a header in the portion of the plurality of headers. The method further includes providing a compressed packet comprising the plurality of compressed headers to a radio link control layer for transmission over a radio interface.

Another aspect relates to a wireless communications apparatus. The wireless communications apparatus can include at least one processor configured to obtain a packet from an upper communication layer comprising a plurality of headers and recursively apply a compression context to the plurality of headers to create a plurality of compressed headers that each correspond to a header in the plurality of headers. The at least one processor is further configured to create a compressed packet comprising the plurality of compressed headers along with data from the packet. The wireless communications apparatus also comprises a memory coupled to the at least one processor.

Yet another aspect relates to an apparatus. The apparatus includes means for receiving a packet from an upper communication layer comprising a plurality of headers. The apparatus also includes means for compressing a portion of the plurality of headers at least in part by recursively using a compression context to create a plurality of compressed headers each corresponding to a header in the portion of the plurality of headers.

Still another aspect relates to a computer program product, which can have a computer-readable medium including code for causing at least one computer to obtain a packet from an upper communication layer comprising a plurality of headers and code for causing the at least one computer to recursively apply a compression context to the plurality of headers to create a plurality of compressed headers that each correspond to a header in the plurality of headers. The computer-readable medium can also comprise code for causing the at least one computer to create a compressed packet comprising the plurality of compressed headers along with data from the packet.

Moreover, an additional aspect relates a packet data convergence protocol (PDCP) layer processing component that receives a packet from an upper communication layer comprising a plurality of headers. The apparatus can further include a recursive compressing component that compresses a portion of the plurality of headers at least in part by recursively using a compression context to create a plurality of compressed headers each corresponding to a header in the portion of the plurality of headers.

According to additional aspects, a method is provided that includes receiving a compressed packet including a plurality of compressed headers and decompressing a portion of the plurality of compressed headers at least in part by recursively using a decompression context to create a plurality of headers each corresponding to a compressed header in the portion of the plurality of compressed headers. The method also includes providing a packet comprising the plurality of headers to an upper communication layer Another aspect relates to a wireless communications apparatus. The wireless communications apparatus can include at least one processor configured to obtain a compressed packet including a plurality of compressed headers and recursively applying a decompression context to a portion of the plurality of compressed headers to create a plurality of headers each corresponding to a compressed header in the portion of the plurality of compressed headers. The at least one processor is further configured to create a packet comprising the plurality of compressed headers and data from the compressed packet. The wireless communications apparatus also comprises a memory coupled to the at least one processor.

Yet another aspect relates to an apparatus. The apparatus includes means for receiving a compressed packet from a radio link control layer comprising a plurality of compressed headers. The apparatus also includes means for decompressing a portion of the plurality of compressed headers at least in part by recursively using a decompression context to create a plurality of headers each corresponding to a compressed header in the portion of the plurality of compressed headers.

Still another aspect relates to a computer program product, which can have a computer-readable medium including code for causing at least one computer to obtain a compressed packet including a plurality of compressed headers and code for causing the at least one computer to recursively apply a decompression context to a portion of the plurality of compressed headers to create a plurality of headers each corresponding to a compressed header in the portion of the plurality of compressed headers. The computer-readable medium can also comprise code for causing the at least one computer to create a packet comprising the plurality of compressed headers and data from the compressed packet.

Moreover, an additional aspect relates to a PDCP layer processing component that receives a compressed packet from a radio link control layer comprising a plurality of compressed headers. The apparatus can further include a recursive decompressing component that decompresses a portion of the plurality of compressed headers at least in part by recursively using a decompression context to create a plurality of headers each corresponding to a compressed header in the portion of the plurality of compressed headers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
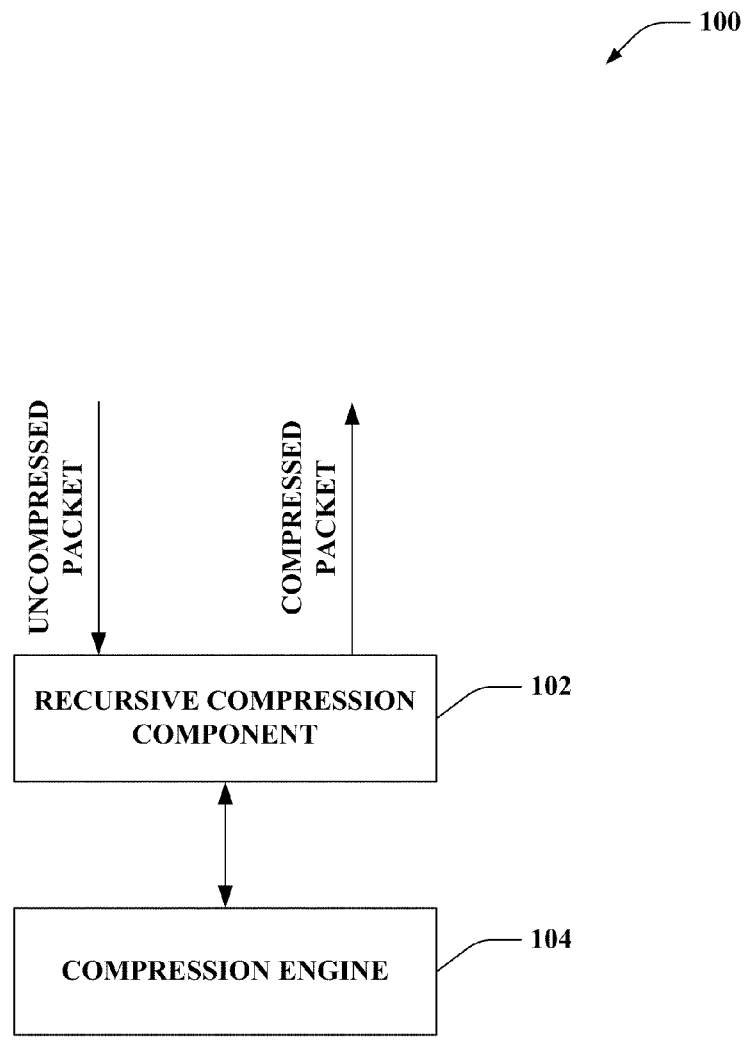
FIG. 1 is an illustration of an example system for recursively compressing packet headers using a compression engine.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a system 100 is illustrated that facilitates compressing a plurality of headers related to a packet to reduce transmission overhead of the packet. System 100 can include a recursive compression component 102 that continually employs a compression engine 104 to compress a plurality of headers related to a packet. The compression engine 104 can utilize an existing compression algorithm to compress a given header, such as robust header compression (RoHC) according to a RoHC profile related to the header and/or the like. Moreover, as described further herein for example, recursive compression component 102 and compression engine 104 can be implemented in one or more access points (e.g., in a packet data convergence protocol (PDCP) layer component, etc.).

According to an example, recursive compression component 102 can receive an uncompressed packet. This can be received from a wireless device or access point, a communication layer, and/or the like, for transmission to a disparate access point or other device. The uncompressed packet, for example, can include one or more packet headers for routing the packet among various relay nodes, as described further herein. In this regard, recursive compression component 102 can compress each of the headers using compression engine 104. In one example, recursive compression component 102 can determine an outermost header of the packet, and can leverage compression engine 104 to compress the outermost header. Recursive compression component 102 can subsequently utilize compression engine 104 to compress a next header, and so on, until a number of headers in the packet have been compressed.

In one example, recursive compression component 102 can utilize compression engine 104 to compress the outermost header. Recursive compression component 102 can subsequently remove and store the outermost header from the packet, and can utilize the compression engine 104 to compress the new outermost header. Recursive compression component 102, for example, extracts the new outermost header and stores the header, and so on, until the last desired header is reached. Recursive compression component 102 can then apply the resulting compressed headers to the packet to create the compressed packet, which can be provided to the entity from which the compressed packet is received. It is to be appreciated that recursive compression component 102 can compress a specified number of headers, compress headers until a certain type of header is reached, compress headers until determining no additional headers remain, and/or the like.

In yet another example, compression engine 104 can be modified to recognize a variety of header profiles. In this example, recursive compression component 102 can match one or more of the innermost headers to a defined profile. In one example, the defined profile can include a number of header types, and the compression engine 104 can determine a profile at least in part by correlating the headers of the packet to those in the profile. Recursive compression component 102 can utilize the compression engine 104 to compress the innermost headers, and if additional headers remain, recursive compression component 102 can match the innermost of the remaining headers to a defined profile, and utilize compression engine 104 to compress the remaining headers according to the defined profile, and so on, until no uncompressed headers remain.

Figure 2:
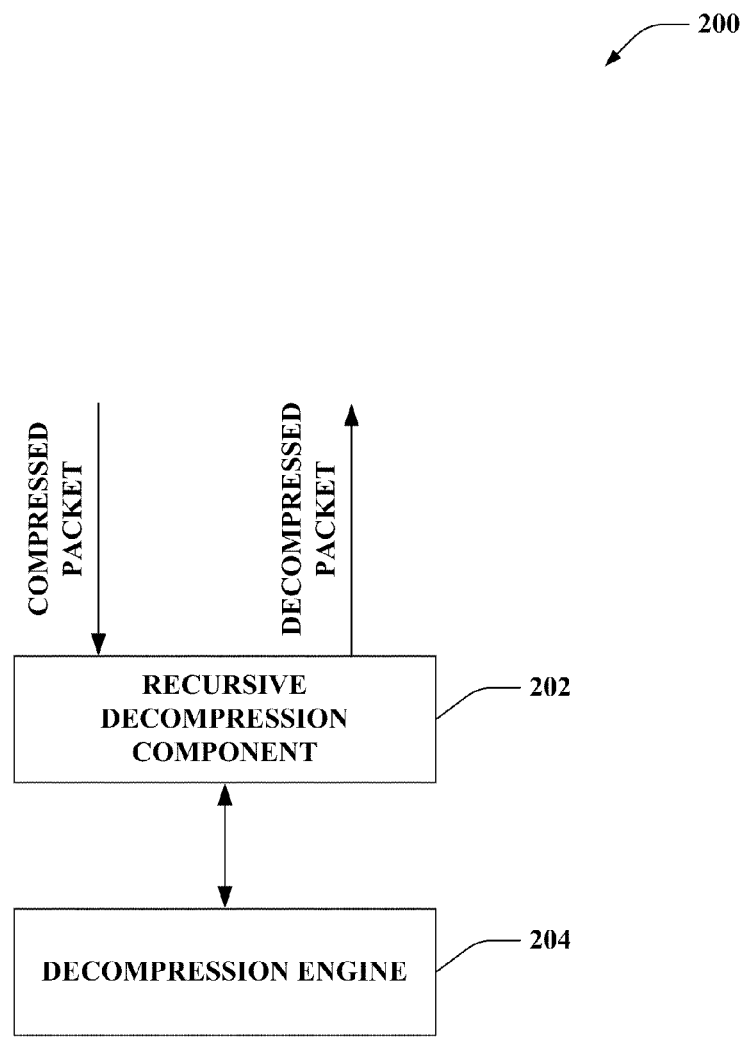
FIG. 2 is an illustration of an example system for recursively decompressing packet headers using a decompression engine.

Turning to FIG. 2, a system 200 is illustrated that facilitates decompressing a plurality of headers related to a packet. System 200 can include a recursive decompression component 202 that continually employs a decompression engine 204 to decompress a plurality of headers related to a packet. Decompression engine 204 can utilize an existing decompression algorithm to decompress a given header, such as robust header compression (RoHC) according to a RoHC profile related to the header and/or the like. Moreover, as described further herein, in an example, recursive decompression component 202 and decompression engine 204 can be implemented in an access point (e.g., as a PDCP layer component, etc.).

According to an example, recursive decompression component 202 can receive a compressed packet. This can be received from a wireless device or access point, a communication layer, and/or the like. The compressed packet, for example, can include one or more compressed packet headers that include information for routing the packet among various relay nodes, as described further herein. In this regard, recursive decompression component 202 can decompress each of the headers using decompression engine 204 so that the headers can be processed (e.g., to appropriately route the packet). In one example, recursive decompression component 202 can determine an outermost compressed header of the packet, and can leverage decompression engine 204 to decompress the outermost compressed header. Recursive decompression component 202 can subsequently utilize decompression engine 204 to decompress a next header, and so on, until a number of compressed headers in the packet have been decompressed.

In one example, recursive decompression component 202 can utilize decompression engine 204 to decompress the outermost compressed header. Recursive decompression component 202 can subsequently remove and store the outermost compressed header from the packet, and can utilize the decompression engine 204 to decompress the new outermost compressed header. Recursive decompression component 202 can store the result and remove the new outermost compressed header, and so on, until the last desired compressed header is decompressed. Recursive decompression component 202 can then associate the decompressed headers to the packet to create the decompressed packet, which can be provided to the entity from which the compressed packet is received. It is to be appreciated that recursive decompression component 202 can decompress a specified number of headers, decompress headers until a certain type of header is reached, decompress headers until determining no additional headers remain, and/or the like.

In yet another example, decompression engine 204 can be modified to recognize a variety of compressed header profiles. In this example, recursive decompression component 202 can match one or more of the innermost compressed headers to a defined profile. In one example, the defined profile can include a number of compressed header types. Recursive decompression component 202 can utilize the decompression engine 204 to decompress the innermost compressed headers, and if additional compressed headers remain, recursive decompression component 202 can match the innermost of the remaining compressed headers to a defined profile, and utilize decompression engine 204 to decompress the compressed headers according to the defined profile, and so on, until no compressed headers remain.

Figure 3:
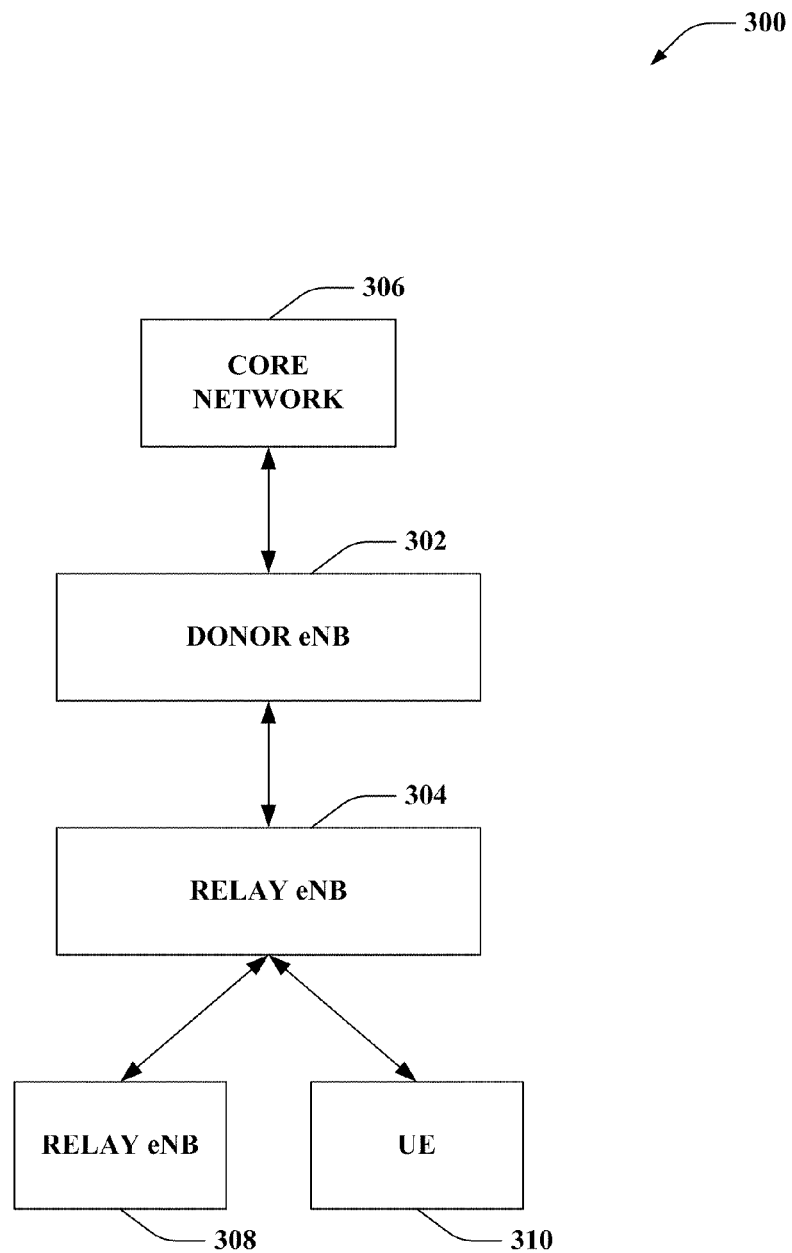
FIG. 3 is an illustration of an example wireless communications system that facilitates providing relays for wireless networks.

Referring to FIG. 3, a wireless communication system 300 is illustrated that facilitates providing relay functionality in wireless networks. System 300 includes a donor eNB 302 that provides one or more relay eNBs, such as relay eNB 304, with access to a core network 306. Similarly, relay eNB 304 can provide one or more disparate relay eNBs, such as relay eNB 308, or UEs, such as UE 310, with access to the core network 306 via donor eNB 302. Donor eNB 302, which can also be referred to as a cluster eNB, can communicate with the core network 306 over a wired or wireless backhaul link, which can be an LTE or other technology backhaul link. In one example, the core network 306 can be a 3GPP LTE or similar technology network.

Donor eNB 302 can additionally provide an access link for relay eNB 304, which can also be wired or wireless, LTE or other technologies, and the relay eNB 304 can communicate with the donor eNB 302 using a backhaul link over the access link of the donor eNB 302. Relay eNB 304 can similarly provide an access link for relay eNB 308 and/or UE 310, which can be a wired or wireless LTE or other technology link. In one example, donor eNB 302 can provide an LTE access link, to which relay eNB 304 can connect using an LTE backhaul, and relay eNB 304 can provide an LTE access link to relay eNB 308 and/or UE 310. Donor eNB 302 can connect to the core network 306 over a disparate backhaul link technology. Relay eNB 308 and/or UE 310 can connect to the relay eNB 304 using the LTE access link to receive access to core network 306, as described. A donor eNB and connected relay eNBs can be collectively referred to herein as a cluster.

According to an example, relay eNB 304 can connect to a donor eNB 302 at the link layer (e.g., media access control (MAC) layer), transport layer, application layer, and/or the like, as would a UE in conventional LTE configurations. In this regard, donor eNB 302 can act as a conventional LTE eNB requiring minimal or no changes at the link layer, transport layer, application layer, etc, or related interface (e.g., user-to-user (Uu), such as E-UTRA-Uu, user-to-network (Un), such as EUTRA-Un, etc.), to support the relay eNB 304. In addition, relay eNB 304 can appear to UE 310 as a conventional eNB in LTE configurations at the link layer, transport layer, application layer, and/or the like, such that minimal or no changes are required for UE 310 to connect to relay eNB 304 at the link layer, transport layer, application layer, etc., for example. In addition, relay eNB 304 can configure procedures for resource partitioning between access and backhaul link, interference management, idle mode cell selection for a cluster, and/or the like. It is to be appreciated that relay eNB 304 can connect to additional donor eNBs, in one example.

Thus, for example, relay eNB 304 can establish a connection with donor eNB 302 to receive access to one or more components in core network 306 (such as a mobility management entity (MME), serving gateway (SGW), packet data network (PDN) gateway (PGW), etc.). In an example, relay eNB 304 can obtain an internet protocol (IP) address from a PGW/SGW in the core network 306 (e.g., via donor eNB 302) for communicating therewith. In addition, UE 310 can establish a connection with relay eNB 304 to receive access to one or more similar components in core network 306. In this regard, for example, UE 310 can communicate IP packets to relay eNB 304 for providing to core network 306. Relay eNB 304 can obtain the IP packets, associate an additional IP header with the packets related to relay eNB 304, and provide the packets to donor eNB 302. In addition, for example, relay eNB 304 can apply a user datagram protocol (UDP) header, general packet radio service (GPRS) tunneling protocol (GTP) header, and/or the like related to relay eNB 304 to the packets. In any case, donor eNB 302 can route the packets to a component of core network 306 related to relay eNB 304 (e.g., by adding another header and transmitting to core network 306).

Components of core network 306, for example, can route the packets within the core network 306 according to the various headers. Moreover, for example, core network 306 can construct packets for providing to UE 310 to include IP, UDP, GTP, etc. headers related to routing the packet to UE 310 through relay eNB 304. In an example, core network 306 can include an IP header related to UE 310 with the packet, as well as a UDP/IP and/or GTP header related to relay eNB 304, and one related to donor eNB 302. Core network 306 can forward the packet with the headers to donor eNB 302. Donor eNB 302 can obtain the packet, remove the UDP/IP and/or GTP header related to donor eNB 302, and forward the packet to relay eNB 304 based on the next UDP/IP and/or GTP header. Relay eNB 304 can similarly remove the header(s) related to relay eNB 304, in one example, and relay eNB 304 can forward the packet to UE 310 based on the remaining IP header or another header. Though one relay eNB 304 is shown between UE 310 and donor eNB 302, it is to be appreciated that additional relay eNBs can exist, and UDP/IP and/or GTP headers can be added to uplink and downlink packets, as described, for each relay eNB to facilitate packet routing.

Addition of the various headers to the packet can introduce significant overhead; for example, the UDP/IP and/or GTP headers can each consume around 40 bytes, and the data to transmit can be a portion of that. In this regard, a PDCP layer of donor eNB 302, relay eNB 304, relay eNB 308, etc. can compress headers of a packet before transmitting and decompress upon receipt to minimize overhead caused by transmitting the headers. This can be part of a PDCP sublayer over a Uu radio interface, a Un radio interface, and/or the like, for instance. In an example, as described, donor eNB 302 can obtain a packet from core network 306 having a plurality of headers. In one example, the packet can relate to a device communicating with relay eNB 308, and thus the packet can include headers related to relay eNB 304, relay eNB 308, and/or the device. In this example, donor eNB 302 (e.g., at a PDCP layer) creates a compressed packet at least in part by compressing the headers related to relay eNB 304, relay eNB 308, and/or the device using recursive header compression, as described herein. In one example, where donor eNB 302 utilizes a parameter that specifies a number of headers to compress/decompress, as described, relay eNB 304 can transmit a tunnel depth to donor eNB 302 (e.g., as part of a request bearer modification or similar message, described further herein) that indicates a number of headers for packets related to a corresponding UE. In this example, donor eNB 302 can compress a number of headers in packets obtained from core network 306 according to the tunnel depth. Donor eNB 302 can transmit the compressed packet to the relay eNB 304.

Relay eNB 304, in this example, can obtain the packet, and can generate the decompressed packet at least in part by decompressing the headers. As described, for example, relay eNB 304 (e.g., at a PDCP layer) can utilize recursive decompression, as described, to decompress the headers. In addition, as described further herein, relay eNB 304 can similarly utilize received tunnel depth parameters to perform a number of recursive decompressions to decompress the headers. Subsequently, relay eNB 304 can determine a next relay eNB to receive the packet (e.g., relay eNB 308) and can remove an outermost header corresponding to relay eNB 304. Relay eNB 304 can similarly (e.g., at a PDCP layer) compress the remaining headers to create a compressed packet, and can transmit the compressed packet to relay eNB 308. Relay eNB 308 can similarly decompress the headers, determine the device to receive the packet, remove a header related to relay eNB 308, compress the remaining headers, and transmit the compressed packet to the device, for example. In this regard, communications among the various nodes are compressed to minimize overhead caused by the multiple headers.

Figure 4:
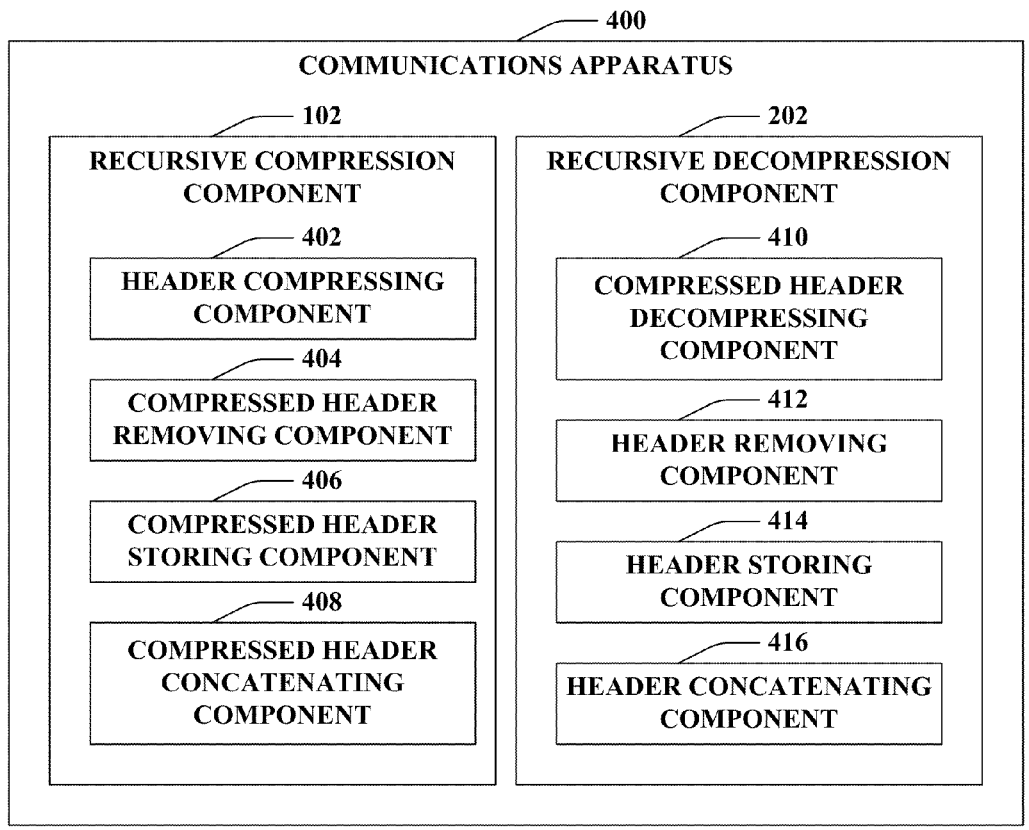
FIG. 4 is an illustration of an example communications apparatus for employment within a wireless communications environment.

Turning now to FIG. 4, a communications apparatus 400 that can participate in a wireless communications network is illustrated. The communications apparatus 400 can be a mobile device, access point, relay node, a portion thereof, or substantially any device that communicates in a wireless network. Communications apparatus 400 includes a recursive compression component 102 that applies a compression engine or context to a plurality of headers relating to a packet and a recursive decompression component 202 that applies a decompression engine or context to a plurality of compressed headers related to a packet. By compressing headers for transmitting a packet and decompressing headers upon receiving a packet, bandwidth required for communicating with communications apparatus 400 is decreased allowing for more efficient wireless communications.

Recursive compression component 102 comprises a header compressing component 402 that leverages a compression engine or context to compress a header of a packet, a compressed header removing component 404 that separates the compressed header from the packet, a compressed header storing component 406 that inputs the compressed header into a hierarchical memory (such as a stack), and a compressed header concatenating component 408 that applies compressed headers stored in memory to the packet. Recursive decompression component 202 comprises a compressed header decompressing component 410 that applies a decompression to one or more compressed headers, a header removing component 412 that separates the decompressed header from the packet, a header storing component 414 that inputs the decompressed header to a memory, and a header concatenating component 416 that associates a plurality of decompressed headers stored in the memory to the packet.

Communications apparatus 400 can communicate with one or more other communications apparatuses (not shown) in a wireless network. As described, for example, communications apparatus 400 can communicate over a radio interface, and thus compressing packet headers can provide efficient communications over the radio interface. According to an example, communications apparatus 400 receives or generates packets for the one or more other communications apparatuses. Recursive compression component 102 can compress one or more headers related to the packets for transmitting over the radio interface. For example, header compressing component 402 can perform compression on an outermost header of the packets. As described, header compressing component 402 can utilize an existing compression engine or context, such as RoHC or similar contexts, to compress the outermost header, such that modifications to the compression engine or context are not required.

Moreover, it is to be appreciated that where RoHC is utilized by the header compressing component 402, it can perform its conventional functions of identifying the flow of the packet, determining the RoHC profile to apply, assigning a context identifier from a pool, encoding the packet following the RoHC profile specification, and managing local variables utilized for future reference, for a given context identifier. Once the outermost header is compressed, compressed header removing component 404 can extract the compressed header from the packet, and compressed header storing component 406 can push the compressed header onto a memory stack, for example. Compressed header concatenating component 408 can determine whether there are more headers to compress (e.g., based on a type or profile of the new outermost header, received tunnel depth parameters, and/or the like). If so, header compressing component 402 can compress the header, compressed header removing component 404 can extract the header, and compressed header storing component 406 pushes the compressed header onto the memory stack, and so on, until compressed header concatenating component 408 determines that the next header is not to be compressed. Following this determination, compressed header concatenating component 408 can pop the top compressed header from the stack memory and concatenate the compressed header to the packet, pop the next compressed header and concatenate to the packet, and so on until no compressed headers remain in the stack memory. In this regard, an existing compression engine or context can be utilized without requiring modification, in this example. Moreover, for example, communications apparatus 400 can then provide the compressed packet to a radio layer for communicating to the one or more other communications apparatuses.

Similarly, communications apparatus 400 can receive compressed packets from the one or more other communications apparatuses over the radio layer, and can utilize recursive decompression component 202 to decompress the compressed packets. For example, compressed header decompressing component 410 can apply a decompression engine or context to the packet to decompress an outermost header. As described, for example, the decompression context can be a RoHC context, which can require no modification. Thus, for example, where a RoHC context is used to decompress the compressed header, it can perform its conventional decompression functions of identifying the context identifier embedded in the RoHC header of the packet, identify a flow of the packet, determine the RoHC profile to apply, decode the packet following the RoHC profile specification, and manage local variable used for future reference.

In any case, once the header is decompressed, header removing component 412 can extract the decompressed header from the packet, and header storing component 414 can push the decompressed header onto a stack memory. Header concatenating component 416 can subsequently determine whether the new outermost header of the packet (if present) is compressed (e.g., based at least in part on a type or profile of the header, received tunnel depth parameters, and/or the like). If so, compressed header decompressing component 410 can again apply the decompression engine or context to the packet to decompress the outermost header, header removing component 412 can extract the decompressed header from the packet, and header storing component 414 can push the decompressed header onto the stack memory, and so on, until header concatenating component 416 determines that the packet has no more compressed headers or that decompression is otherwise no longer needed. Following such a determination, header concatenating component 416 can pop the decompressed headers from the stack memory and associate each decompressed header with the packet until no decompressed headers remain in the stack memory. Communications apparatus 400 can then provide the decompressed packet to an upper communication layer for processing, in an example.

According to one example, communications apparatus 400 can communicate packets with the one or more other communications apparatuses that include one or more GTP headers, as described. In this example, communications apparatus 400 can be a UE, relay node, or donor access point communicating with one or more relay nodes, for example. Thus, packets related to the one or more other communications apparatuses can include a plurality of GTP headers to facilitate routing the packets thereto and further to other devices communicating therewith. In this regard, as recursive compression component 102 is compressing the one or more GTP headers, compressed header concatenating component 408 can determine whether a profile of an outermost header is GTP. If so, header compressing component 402 can compress the outermost header, compressed header removing component 404 can extract the compressed header, and compressed header storing component 406 can push the compressed header onto the stack memory, and so on, until compressed header concatenating component 408 encounters an outermost header that does not have a GTP profile. Similarly, the recursive decompression component 202 can decompress a plurality of headers until header concatenating component 416 encounters a header that does not have a GTP profile, for example.

In the foregoing examples, header compressing component 402 can compress the GTP headers followed by another header that is not a GTP header (e.g., where compressed header concatenating component 408 determines whether a header is GTP after the header is compressed, extracted, and stored). In an example, a voice packet can include voice data along with an IP/UDP/real-time transport protocol (RTP) header related to a UE, and a GTP header (which can be a IP/UDP/GTP header) for each node in a communications path between the UE and a donor eNB (as described in FIG. 3). Thus, recursive compression component 102 can compress not only the GTP headers, but also the IP/UDP/RTP header as well. It is to be appreciated that the recursive compression component 102 can be utilized for substantially any header type that can be compressed by the compression engine, such as transmission control protocol (TCP), encapsulating security payload (ESP), etc. Thus, the plurality of GTP headers can be compressed along with a TCP header, in a data example. Similarly, recursive decompression component 202 can decompress a plurality of GTP headers plus a non-GTP header that follows the GTP headers in the packet.

Moreover, in an example, communications apparatus 400 can receive tunnel depth information from one or more access points in a wireless network (e.g., in a request bearer modification message, RRC connection reconfiguration message, and/or similar messages), as described further herein. In this example, upon compressing, extracting, and storing a given header in a packet, compressed header concatenating component 408 can determine whether a number of headers corresponding to the tunnel depth have been compressed before combining the compressed headers to create a compressed packet. Similarly, header concatenating component 416 can determine whether a number of compressed headers corresponding to tunnel depth have been decompressed before combining the decompressed headers to create a packet.

Figure 5:
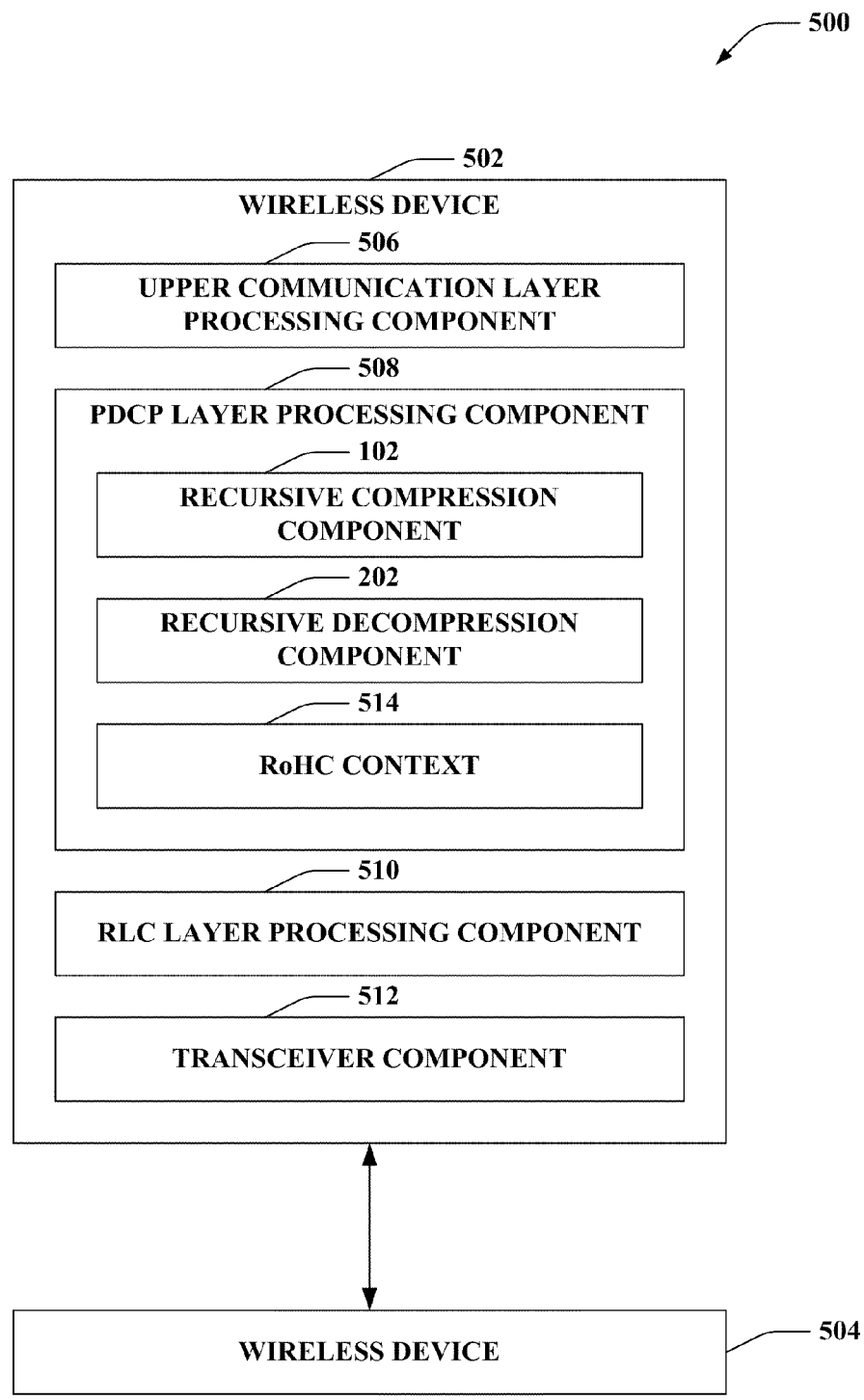
FIG. 5 is an illustration of an example wireless communications system that facilitates recursively compressing and decompressing packet headers.

Referring to FIG. 5, illustrated is example wireless communications system 500 that facilitates applying recursive header compression/decompression to one or more packets at a PDCP layer. System 500 can include a wireless device 502 that provides one or more disparate wireless devices, such as wireless device 504, with access to a wireless network (not shown). Wireless devices 502 and 504 can each be an access point, such as a macrocell access point, a femtocell or picocell access point, mobile base station, eNB, a portion thereof, and/or the like, a mobile device, such as a UE, modem (or other tethered device), a portion thereof, and/or the like, etc. In addition, it is to be appreciated that wireless device 504 can include similar components as wireless device 502 to provide similar functionality, in one example.

Wireless device 502 can include an upper communication layer processing component 506 that processes packets received from a PDCP layer and provides packets to the PDCP layer for compression and transmission thereof, a PDCP layer processing component 508 that compresses packets received from an upper communication layer and/or decompresses packets received from a radio link control (RLC) layer, an RLC layer processing component 510 that prepares PDCP layer communications for transmission as one or more RLC service data units (SDU) and/or reassembles SDUs received from another wireless device into a PDCP packet data unit (PDU) for providing to a PDCP layer, and a transceiver component 512 that communicates with a disparate wireless device over a radio interface.

According to an example, upper communication layer processing component 506 can generate packets to communicate to wireless device 504, and can provide the packets to PDCP layer processing component 508 for compression. Recursive compression component 102 can apply compression to a plurality of headers in the packet, as described, leveraging RoHC context 514 to compress each of the plurality of headers. For example, the plurality of headers can include GTP headers, as described, and the recursive compression component 102 can compress the plurality of headers until a non-GTP header is processed. In another example, recursive compression component 102 can recursively apply RoHC context 514 to compress the plurality of headers according to a received tunnel depth. In yet another example, RoHC context 514 can define one or more RoHC profiles related to multiple header types, and recursive compression component 102 can begin applying the profiles to one or more innermost headers in the plurality of headers until no uncompressed headers remain.

For example, recursive compression component 102 can define the following profiles for RoHC:
    IP|UDP|GTP|IP|UDP|RTP
    IP|UDP|GTP|IP|TCP
    IP|UDP|GTP|IP|ESP
    IP|UDP|GTP|IP|UDP|GTP|IP|UDP|RTP
    IP|UDP|GTP|IP|UDP|GTP|IP|TCP
    IP|UDP|GTP|IP|UDP|GTP|IP|ESP
    IP|UDP|GTP|IP|UDP|GTP
    IP|UDP|GTP Thus, recursive compression component 102 can determine whether one or more innermost headers correspond to any of the contexts and can utilize RoHC context 514 to apply compression to the one or more innermost headers, and can continue until no uncompressed headers remain. In one example, PDCP layer processing component 508 can receive a packet with a header profile IP|UDP|GTP|IP|UDP|GTP|IP|UDP|RTP. Recursive compression component 102 can detect the header as defined in the set of RoHC profiles defined above. Recursive compression component 102 can, for example, skip to the IP|UDP|RTP portion of the header and utilize RoHC context 514 to compress this portion of the header. Recursive compression component 102 can determine that the header profile IP|UDP|GTP|IP|UDP|GTP is not yet compressed and can skip to the second IP|UDP|GTP upon detecting the profile, utilizing RoHC context 514 to compress. Similarly, recursive compression component 102 can determine that the first IP|UDP|GTP is not yet compressed and can utilize RoHC context 514 to compress.

In any case, PDCP layer processing component 508 can provide the compressed packet as a PDCP PDU to RLC layer processing component 510, which can break the PDCP PDU into one or more RLC SDUs for transmission to wireless device 504. Transceiver component 512 can communicate the one or more RLC SDUs to the wireless device 504.

In another example, wireless device 502 can receive the packets from a disparate wireless device (not shown) for transmitting to wireless device 504. In this example, transceiver component 512 can receive a plurality of RLC SDUs comprising the packets, and RLC layer processing component 510 can formulate one or more PDCP PDUs related to the packets. RLC layer processing component 510 can provide the PDCP PDUs to PDCP layer processing component 508. Recursive decompression component 202 can apply recursive decompression to the compressed packets relating to the PDCP PDU, as described herein, using RoHC context 514 to apply decompression to each compressed header in the compressed packets. As described, for example, the compressed headers can be GTP headers, and recursive decompression component 202 can decompress the compressed headers until a non-GTP header is processed, until it reaches a number indicated in a tunnel depth parameter, and/or the like.

In another example, recursive decompression component 202 can similarly define RoHC profiles to process multiple compressed headers, as described above. In this example, recursive decompression component 202 can decompress an outermost header that conforms to a defined profile. Thus, in the example given above of a IP|UDP|GTP|IP|UDP|GTP|IP|UDP|RTP packet, recursive decompression component 202 can detect the IP|UDP|GTP compressed header and utilize RoHC context 514 to decompress. Recursive decompression component 202 can subsequently detect the IP|UDP|GTP|IP|UDP|GTP header profile due to the decompressed IP|UDP|GTP header and can utilize RoHC context 514 to decompress the second IP|UDP|GTP header. Recursive decompression component 202 can subsequently detect the IP|UDP|GTP|IP|UDP|GTP|IP|UDP|RTP header profile due to the second decompressed IP|UDP|GTP header and can utilize RoHC context 514 to decompress the IP|UDP|RTP header.

In any case, PDCP layer processing component 508 can provide the decompressed packets to upper communication layer processing component 506. As described, upper communication layer processing component 506 can determine the packets relate to wireless device 504 (e.g., based at least in part on one or more identifiers in the packets) and can remove a header from the packets corresponding to wireless device 502 (e.g., a GTP header). Then PDCP layer processing component 508 can recompress the headers, RLC layer processing component 510 can formulate RLC SDUs related to the packets, and transceiver component 512 can communicate the RLC SDUs (e.g., to wireless device 504), as described.

Figure 6:
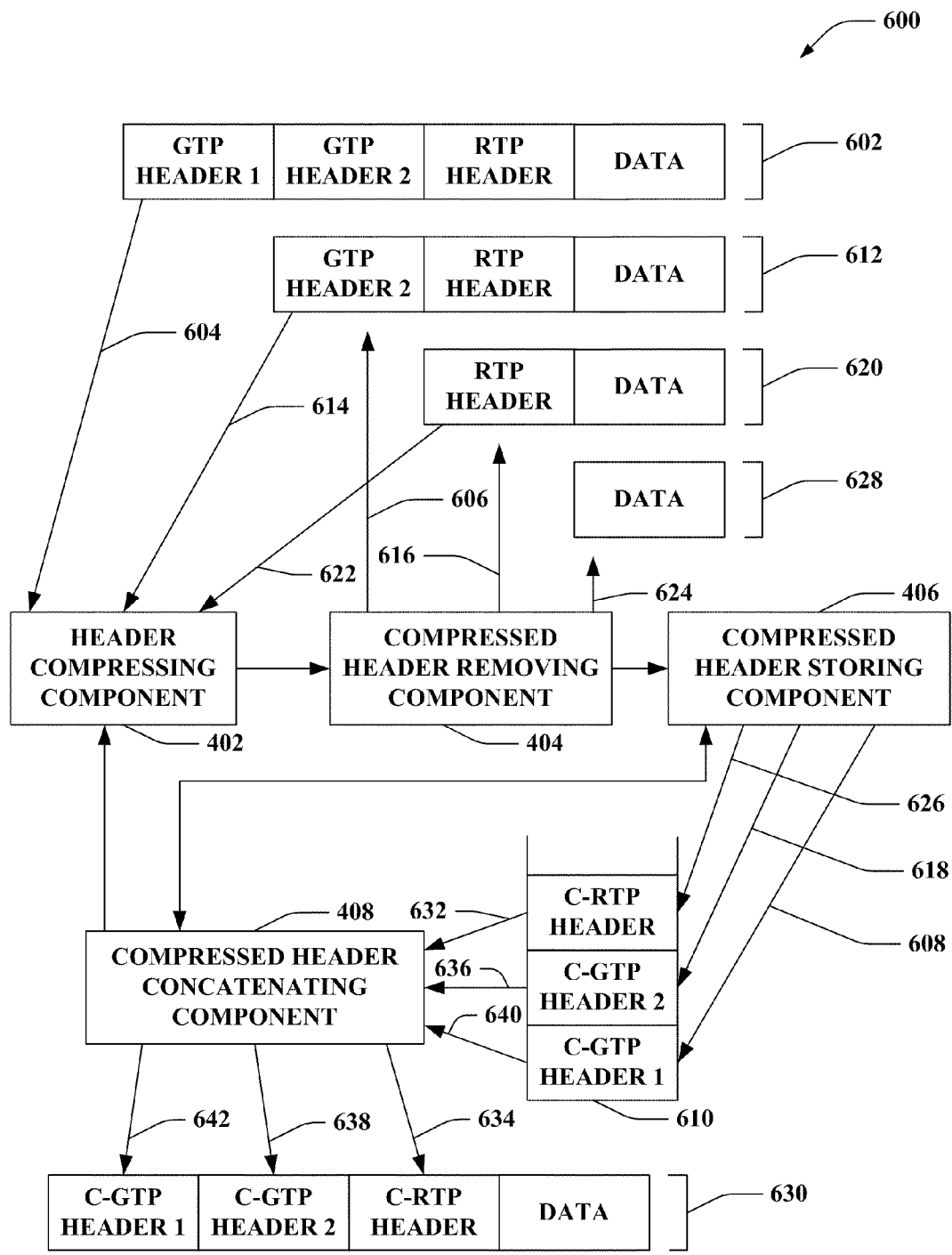
FIG. 6 is an illustration of an example wireless communications system that compresses packet headers by recursively utilizing a compression context.

Now turning to FIG. 6, an example system 600 that recursively compresses multiple headers of a packet is illustrated. System 600 includes a header compressing component 402 that leverages a compression engine or context to compress a header of a packet, a compressed header removing component 404 that separates the compressed header from the packet, a compressed header storing component 406 that inputs the compressed header into a memory, and a compressed header concatenating component 408 that applies compressed headers stored in memory to the packet. As described, system 600 can be implemented within a PDCP sublayer of a node that participates in a wireless communication network, which utilizes relay nodes, for example.

Given a packet 602 that includes two GTP headers and an RTP header, as shown, header compressing component 402 can compress the outermost GTP header at 604 (e.g., using RoHC or an existing compression engine). Header compressing component 402 can pass the packet to compressed header removing component 404, which can extract the compressed header to produce packet 612. Compressed header removing component 404 can also communicate the compressed packet to compressed header storing component 406, which can store the compressed GTP header in stack 610 at 608. Compressed header concatenating component 408 can determine a type or profile of the compressed header, for example, by communicating with compressed header storing component 406, accessing the stack 610, and/or the like. In another example, compressed header concatenating component 408 can determine an index related to compressing headers of the packet and whether the index corresponds to a received tunnel depth.

Subsequently, header compressing component 402 can compress the outermost header of packet 612 (e.g., based on a command from compressed header concatenating component 408 or otherwise) at 614 and can provide the packet with the compressed header to compressed header removing component 404, which can extract the compressed header at 616. Compressed header removing component 404 can provide the extracted compressed header to compressed header storing component 406, which can push the compressed header on stack 610 at 618. Compressed header concatenating component 408 can determine the header is GTP and can cause header compressing component 402 to compress an outermost header of packet 620 at 622. In another example, compressed header concatenating component 408 can again determine whether an index related to compressing headers corresponds to a received tunnel depth and can cause header compressing component 402 to compress an outermost header of packet 620 at 622. Header compressing component 402 can pass the compressed packet to compressed header removing component 404, which can extract the compressed RTP header at 624. Compressed header storing component 406 can similarly store the compressed RTP header on stack 610 at 626. Compressed header concatenating component 408 can determine that the header is not GTP (e.g., and/or that an index related to compressing headers is equal to a received tunnel depth) and can begin processing the headers to data 628.

In this regard, compressed header concatenating component 408 can formulate a compressed packet 630 by appending the compressed headers to data 628. Thus, for example, compressed header concatenating component 408 can pop the first compressed header from stack 610, which can be the compressed RTP header at 632, and can insert the compressed RTP header to the data to begin creating compressed packet 630 at 634. Similarly, compressed header concatenating component 408 can pop the next header from stack 610 at 636, and can insert the header to the beginning of the packet 630 at 638. Compressed header concatenating component 408 can pop the last compressed header from stack 610 at 640 and can insert the compressed header at the beginning of packet 630 at 642. In this regard, compressed packet 630 is created by recursively compressing its related headers using existing compression technology. In addition, similar concepts can be applied to decompress packets with compressed headers, as described.

Figure 7:
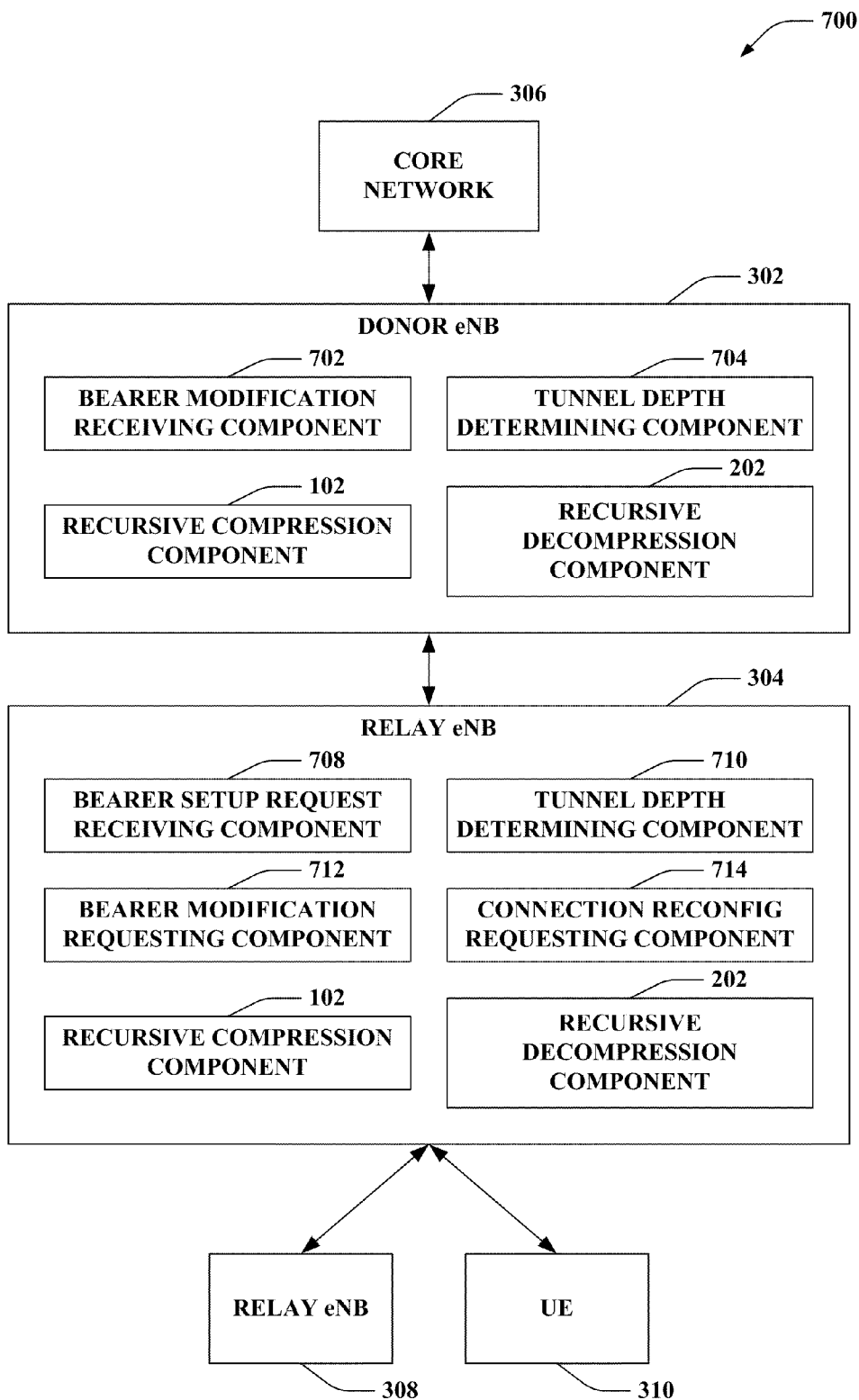
FIG. 7 is an illustration of an example wireless communications system that recursively compresses and decompresses packet headers according to received tunnel depth information.

Referring now to FIG. 7, an example wireless communication system 700 is illustrated that facilitates recursively compressing/decompressing packet headers according to received tunnel depth parameters. System 700 includes a donor eNB 302 that provides one or more relay eNBs, such as relay eNB 304, with access to a core network 306. Similarly, relay eNB 304 can provide one or more disparate relay eNBs, such as relay eNB 308, or UEs, such as UE 310, with access to the core network 306 via donor eNB 302, as described. Donor eNB 302 can communicate with the core network 306 over a wired or wireless backhaul link, which can be an LTE or other technology backhaul link. In one example, the core network 306 can be a 3GPP LTE or similar technology network. In addition, it is to be appreciated that donor eNB 302 can include components of relay eNB 304, and vice versa, to provide similar functionality. Moreover, for example, relay eNB 308 can comprise similar components as well.

Donor eNB 302 includes a bearer modification receiving component 702 that obtains a bearer modification message from a relay eNB and a tunnel depth determining component 704 that receives a tunnel depth parameter from the bearer modification message. Donor eNB 302 also comprises a recursive compression component 102 that compresses a plurality of headers in a packet by recursively calling a compression engine or context and a recursive decompression component 202 that decompresses a plurality of compressed headers in a packet by recursively utilizing a decompression engine or context.

Relay eNB 304 comprises a bearer setup request receiving component 708 that obtains a bearer setup request from a core network (e.g., via a donor eNB), a tunnel depth determining component 710 that receives one or more tunnel depth parameters from the bearer setup request, and a bearer modification requesting component 712 that transmits a bearer modification request to a core network (e.g., via a donor eNB). Relay eNB 304 also includes a connection reconfiguration requesting component 714 that transmits a connection reconfiguration request to one or more downstream nodes, a recursive compression component 102 that compresses a plurality of headers in a packet by recursively calling a compression engine or context and a recursive decompression component 202 that decompresses a plurality of compressed headers in a packet by recursively utilizing a decompression engine or context.

According to an example, core network 306 can communicate a bearer setup request to relay eNB 304 (e.g., via donor eNB 302). In an example, the bearer setup request can be sent by a MME, or a similar node of core network 306, and can relate to a number of eNBs between relay eNB 304 and a related UE, such as UE 310. For example, bearer setup request receiving component 708 can obtain the bearer setup request from core network 306, and tunnel depth determining component 710 can receive the tunnel depth information from the bearer setup request. Tunnel depth determining component 704 can provide the tunnel depth+1 to recursive compression component 102 and recursive decompression component 202 of relay eNB 304, which can utilize (and/or store) the tunnel depth+1 for recursively compressing/decompressing headers, as described. Bearer modification requesting component 712 can generate a request bearer modification message (e.g., as similarly defined for relay nodes in 3GPP LTE) in response to the bearer setup request, and can include the tunnel depth+1 in the request bearer modification message. Bearer modification requesting component 712 can transmit the request bearer modification message upstream for providing to core network 306.

Bearer modification receiving component 702 can obtain the request bearer modification message, and tunnel depth determining component 704 can extract the tunnel depth parameter, as described. Similarly, tunnel depth determining component 704 can provide the tunnel depth+1 to recursive compression component 102 and recursive decompression component 202 of donor eNB 302, which can store the received tunnel depth+1 for compressing/decompressing headers, as described. In addition, in one example, where intermediary relay eNBs exist between relay eNB 304 and donor eNB 302, the intermediary relay eNBs can similarly receive the tunnel depth information in the request bearer modification message, add 1 to the tunnel depth for utilizing with recursive compress/decompression, and forward the request bearer modification message upstream with the incremented tunnel depth parameter such that each eNB in the path can perform one more compression and/or decompression for related packets than an eNB directly downstream.

In addition, for example, connection reconfiguration requesting component 714 can transmit an RRC connection request message to a downstream relay eNB (e.g., relay eNB 308) or UE (e.g., UE 310) related to the bearer setup request, and can include the tunnel depth, as received in the bearer setup request, in the RRC connection request message. Thus, relay eNB 308 and/or UE 310 can store the tunnel depth information. In addition, where there are additional relay eNBs downstream from relay eNB 308 that relate to the bearer setup request, relay eNB 308 can subtract 1 from the tunnel depth and forward the RRC connection request with the tunnel depth+1. In this regard, each eNB can receive the tunnel depth information, which can be utilized by recursive compression components 102 and recursive decompression components 202, as described, to apply a compression/decompression engine recursively according to the tunnel depth.

Figure 8:
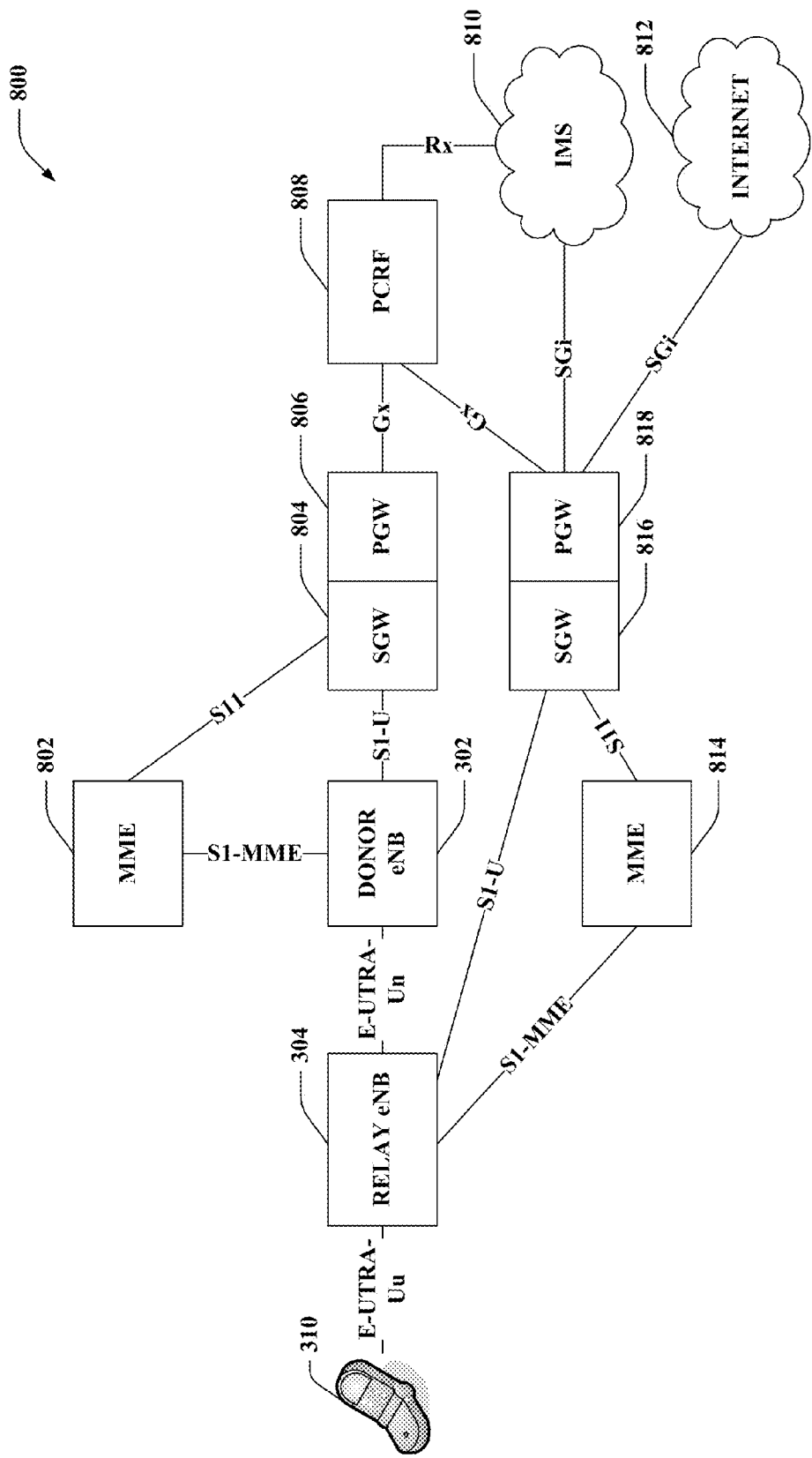
FIG. 8 is an illustration of an example wireless communications system that utilizes internet protocol (IP) relays to provide access to a wireless network.

Now turning to FIG. 8, an example wireless communication network 800 that provides IP relay functionality is depicted. Network 800 includes a UE 310 that communicates with a relay eNB 304, as described, to receive access to a wireless network. Relay eNB 304 can communicate with a donor eNB 302 to provide access to a wireless network, and as described, donor eNB 302 can communicate with an MME 802 and/or SGW 804 that relate to the relay eNB 304. SGW 804 can connect to or be coupled with a PGW 806, which provides network access to SGW 804 and/or additional SGWs. PGW 806 can communicate with a policy and charging rules function (PCRF) 808 to authenticate/authorize relay eNB 304 to use the network, which can utilize an IP multimedia subsystem (IMS) 810 to provide addressing to the relay eNB 304.

According to an example, SGW 804 and PGW 806 can also communicate with SGW 816 and PGW 818, which can be related to UE 310. For example, SGW 816 and/or PGW 818 can assign an IP address to UE 310 and can communicate therewith via SGW 804 and PGW 806, donor eNB 302, and relay eNB 304. Communications between UE 310 and SGW 816 and/or PGW 818 can be tunneled through the nodes. SGW 804 and PGW 806 can similarly tunnel communications between UE 310 and MME 814. PGW 818 can similarly communicate with a PCRF 808 to authenticate/authorize UE 310, which can communicate with an IMS 810. In addition, PGW 818 can communicate directly with the IMS 810 and/or internet 812.

In an example, UE 310 can communicate with the relay eNB 304 over one or more radio protocol interfaces, such as an E-UTRA-Uu interface, as described, and the relay eNB 304 can communicate with the donor eNB 302 using one or more radio protocol interfaces, such as an E-UTRA-Un or other interface. As described, relay eNB 304 can add a UDP/IP and/or GTP header related to SGW 804 and/or PGW 806 to packets received from UE 310 and can forward the packets to donor eNB 302. As described, in one example, relay eNB 304 can compress the GTP header (and/or recursively compress other GTP or additional headers in the packets at a PDCP layer) Moreover, relay eNB 304 can map the packets to at least one of a limited number of radio bearers established with donor eNB 302. Donor eNB 302 can receive the packets over an RLC layer and deliver packets, or portions thereof, to its PDCP layer regardless of order, as described above. Donor eNB 302 communicates with the MME 802 using an S1-MME interface and the SGW 804 and PGW 806 over an S1-U interface, as depicted. For example, donor eNB 302 can similarly add an UDP/IP and/or GTP header to the packets and forward to MME 802 or SGW 804. In addition, in an example, donor eNB 302 can recursively decompress compressed headers of the packet, as described.

SGW 804 and/or PGW 806 can utilize the UDP/IP and/or GTP headers to route the packets within the core network. For example, as described, SGW 804 and/or PGW 806 can receive the packets and remove the outer UDP/IP and/or GTP header, which relates to the SGW 804 and/or PGW 806. SGW 804 and/or PGW 806 can process the next UDP/IP and/or GTP header to determine a next node to receive the packets, which can be SGW 816 and/or PGW 818, which relate to UE 310. Similarly, SGW 816 and/or PGW 818 can obtain downlink packets related to UE and can include an UDP/IP header and/or GTP header related to communicating the packets to relay eNB 304 for providing to UE 310. SGW 816 and/or PGW 818 can forward the packets to SGW 804 and/or PGW 806, which relate to relay eNB 304. SGW 804 and/or PGW 806 can further include an additional UDP/IP and/or GTP header in the packets related to donor eNB 302.

Moreover, SGW 804 and/or PGW 806 can select a GTP tunnel over which to communicate the packets to donor eNB 302. This can be based on information in the UDP/IP and/or GTP headers received from SGW 816 and/or PGW 818, as described, and/or the like. SGW 804 and/or PGW 806 can communicate the packets to donor eNB 302 over the tunnel (e.g., by including one or more parameters in the GTP header included by SGW 804 and/or PGW 806). Donor eNB 302 can remove the outer GTP and/or UDP/IP header included by SGW 804 and/or PGW 806 and can determine a next node to receive the packets. Donor eNB 302 can thus transmit the packets to relay eNB 304 over a radio bearer related to the GTP tunnel As described, for example, donor eNB 302 can recursively compress GTP and/or other headers of the packet, as described herein, to allow more efficient communication of the packets to relay eNB 304 over the Un radio interface. Relay eNB 304 can receive the packets and can similarly recursively decompress the headers, as described. Relay eNB 304 can also determine a next node to receive the packets and/or a bearer over which to transmit the packets based at least in part on one or more parameters in the next UDP/IP or GTP header, the radio bearer over which the packets are received, etc. Relay eNB 304 can remove the UDP/IP and GTP headers related to relay eNB 304, compress remaining headers, in one example, and transmit the packets to UE 310. UE 310, as described, can decompress compressed headers at a PDCP layer for processing thereof by an upper communication layer.

Referring to FIGS. 9-13, methodologies relating to recursively compressing and decompressing headers using a compression/decompression context are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 9:
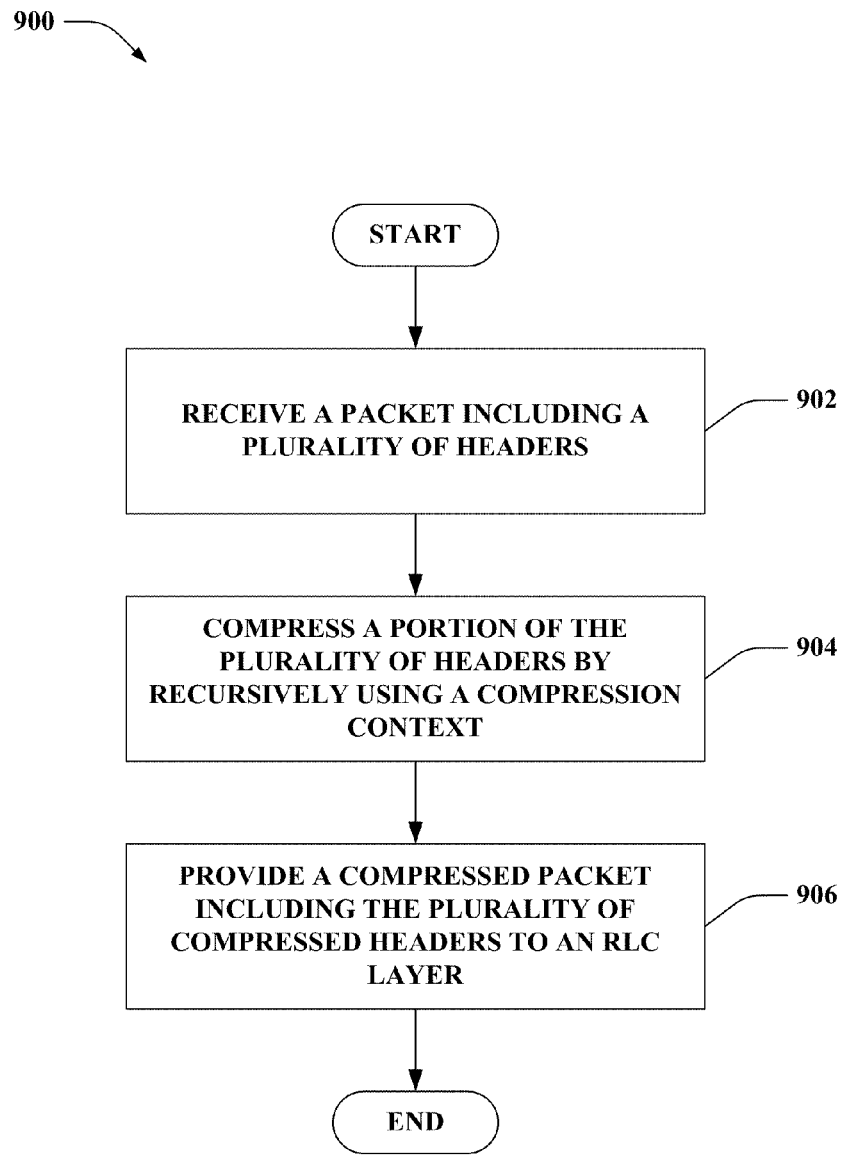
FIG. 9 is an illustration of an example methodology that compresses a plurality of packet headers by recursively using a compression context.

Turning to FIG. 9, an example methodology 900 that facilitates recursively compressing packet headers is illustrated. At 902, a packet including a plurality of headers can be received. As described, for example, the packet can include headers for routing the packet among various relay nodes (e.g., GTP headers), a header related to associating the packet with a device (e.g., an RTP header in voice communications), and/or the like. At 904, a portion of the plurality of headers can be compressed by recursively using a compression context. The compression context can utilize an existing compression technology, such as RoHC, without requiring modification thereto. In addition, compressing the portion of the plurality of headers can include compressing an outermost header using the compression context, extracting the outermost header as compressed from the packet, storing the outermost header as compressed in a hierarchical memory, and repeating the steps until the intended headers are compressed. Subsequently, the compressed headers can be extracted from the hierarchical memory and associated with data from the packet to create a compressed packet, as described. At 906, a compressed packet including the plurality of compressed headers can be provided to an RLC layer (e.g., for transmission to one or more devices).

Figure 10:
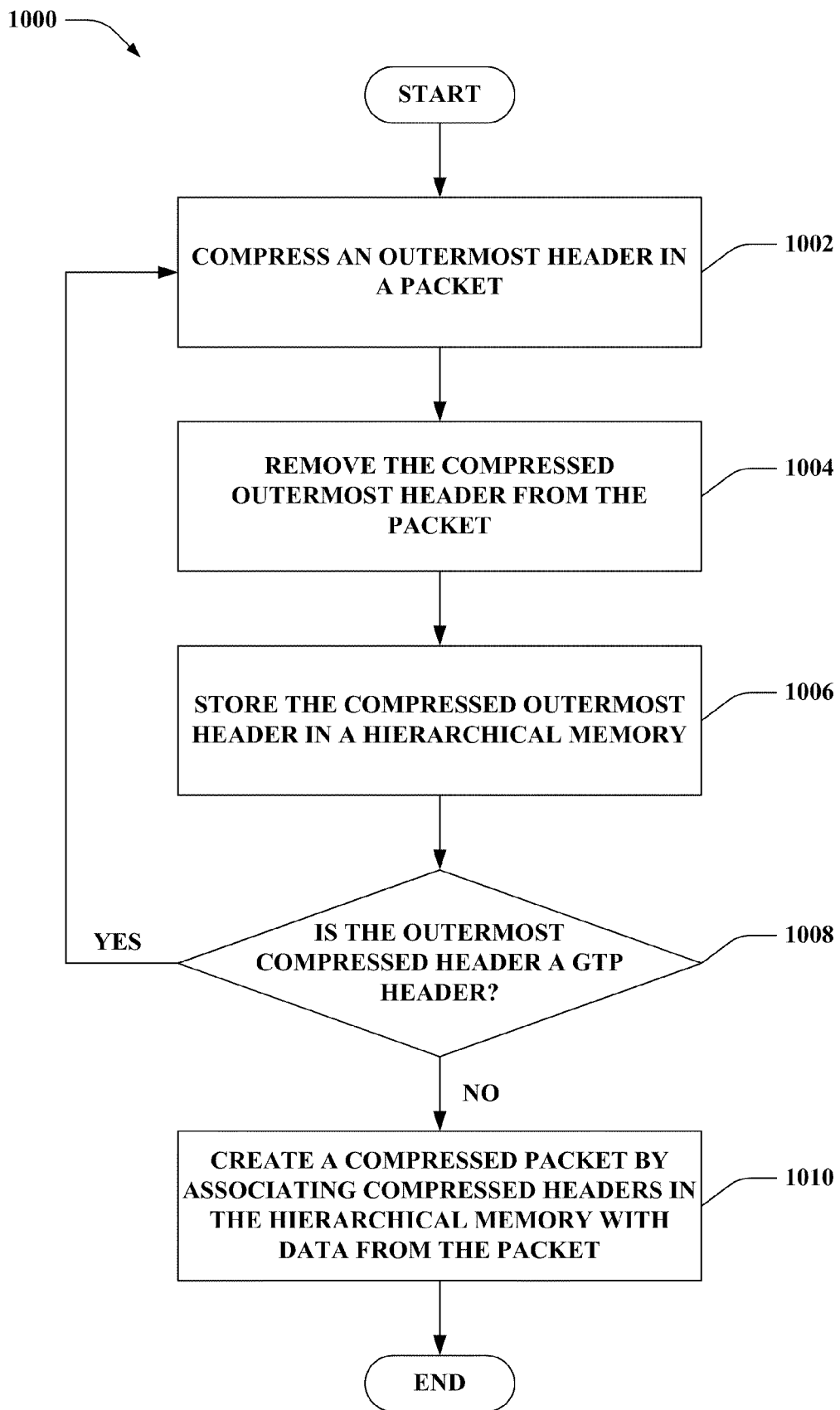
FIG. 10 is an illustration of an example methodology for recursively compressing a plurality of packet headers.

Referring to FIG. 10, an example methodology 1000 is depicted that facilitates recursively compressing headers of received packets. At 1002, an outermost header of a packet can be compressed. As described, this can be a packet received from an upper communication layer that includes multiple headers for routing the packet among relay nodes, for example. At 1004, the compressed outermost header can be removed from the packet. Thus, the packet can have one or more additional headers that can be compressed, in one example. At 1006, the compressed outermost header can be stored in a hierarchical memory. For example, as described, the hierarchical memory can include a stack upon which the compressed outermost header can be pushed. At 1008, it can be determined whether the compressed outermost header is a GTP header. If so, the method 1000 can continue at 1002 where the next outermost header in the packet can be compressed. If the outermost header is determined not to be a GTP header at 1008, then at 1010, a compressed packet can be created by associating compressed headers in the hierarchical memory with data from the packet. Thus, as described, the headers of the packet can be compressed and removed by recursively using a compression context, which compresses the outermost header of the packet. The removed headers can be reapplied to data in the packet to generate the compressed packet. In this regard, existing compression engines or contexts can be utilized without requiring modification to handle multiple headers, in one example.

Figure 11:
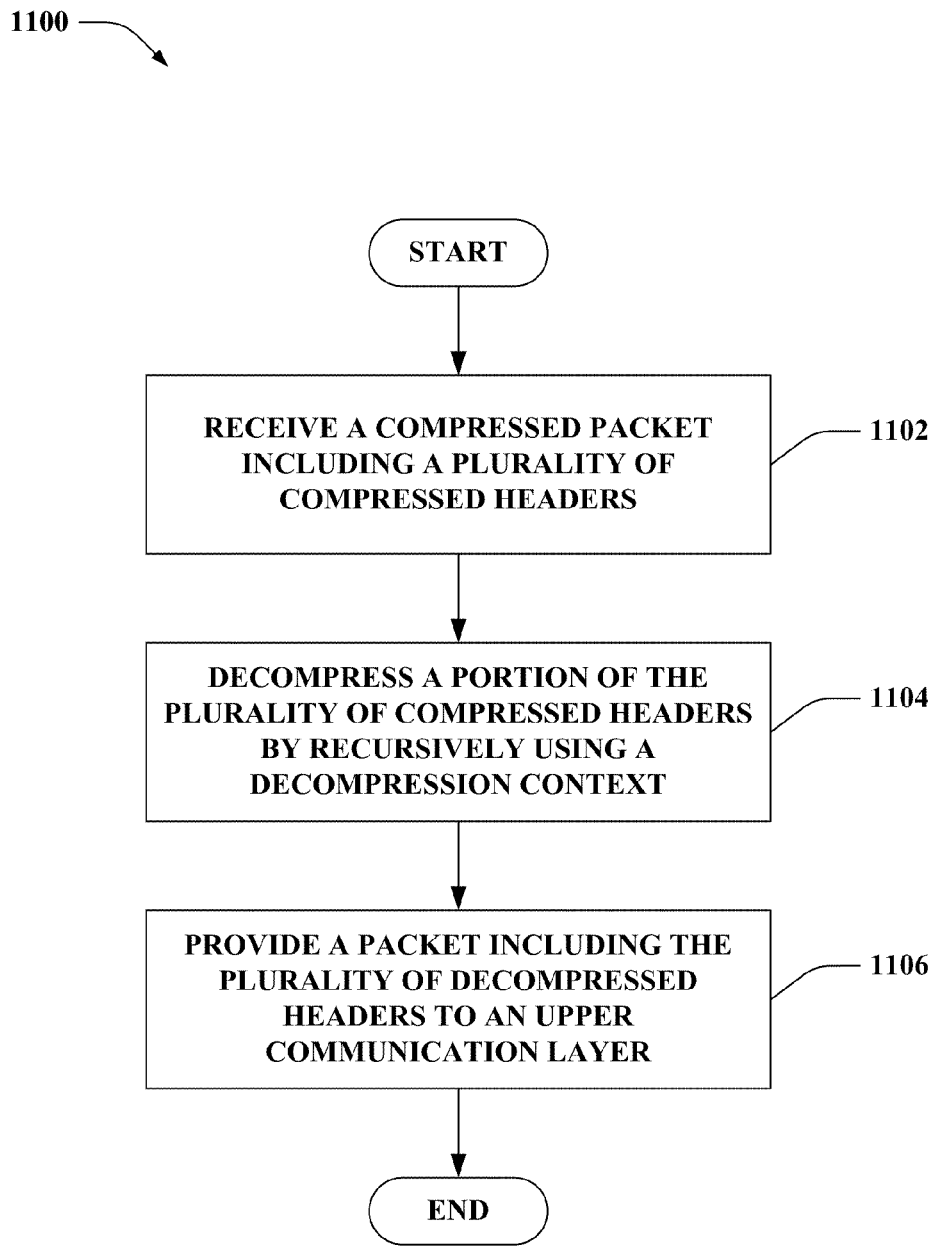
FIG. 11 is an illustration of an example methodology that decompresses a plurality of packet headers by recursively using a decompression context.

Turning to FIG. 11, an example methodology 1100 that facilitates recursively decompressing packet headers is illustrated. At 1102, a compressed packet including a plurality of compressed headers can be received. As described, for example, the compressed packet can include compressed headers related to routing the packet among various relay nodes (e.g., compressed GTP headers), a compressed header related to associating the packet with a device (e.g., a compressed RTP header in voice communications), and/or the like. At 1104, a portion of the plurality of compressed headers can be decompressed by recursively using a decompression context. The decompression context can utilize an existing decompression technology, such as RoHC, without requiring modification thereto. In addition, decompressing the portion of the plurality of compressed headers can include decompressing an outermost header using the decompression context, extracting the outermost header as decompressed from the packet, storing the outermost header as decompressed in a hierarchical memory, and repeating the steps until the intended headers of the compressed packet are decompressed. Subsequently, the decompressed headers can be extracted from the hierarchical memory and associated with data from the packet to create a packet, as described. At 1106, a packet including the plurality of headers (e.g., as decompressed) can be provided to an upper communication layer.

Figure 12:
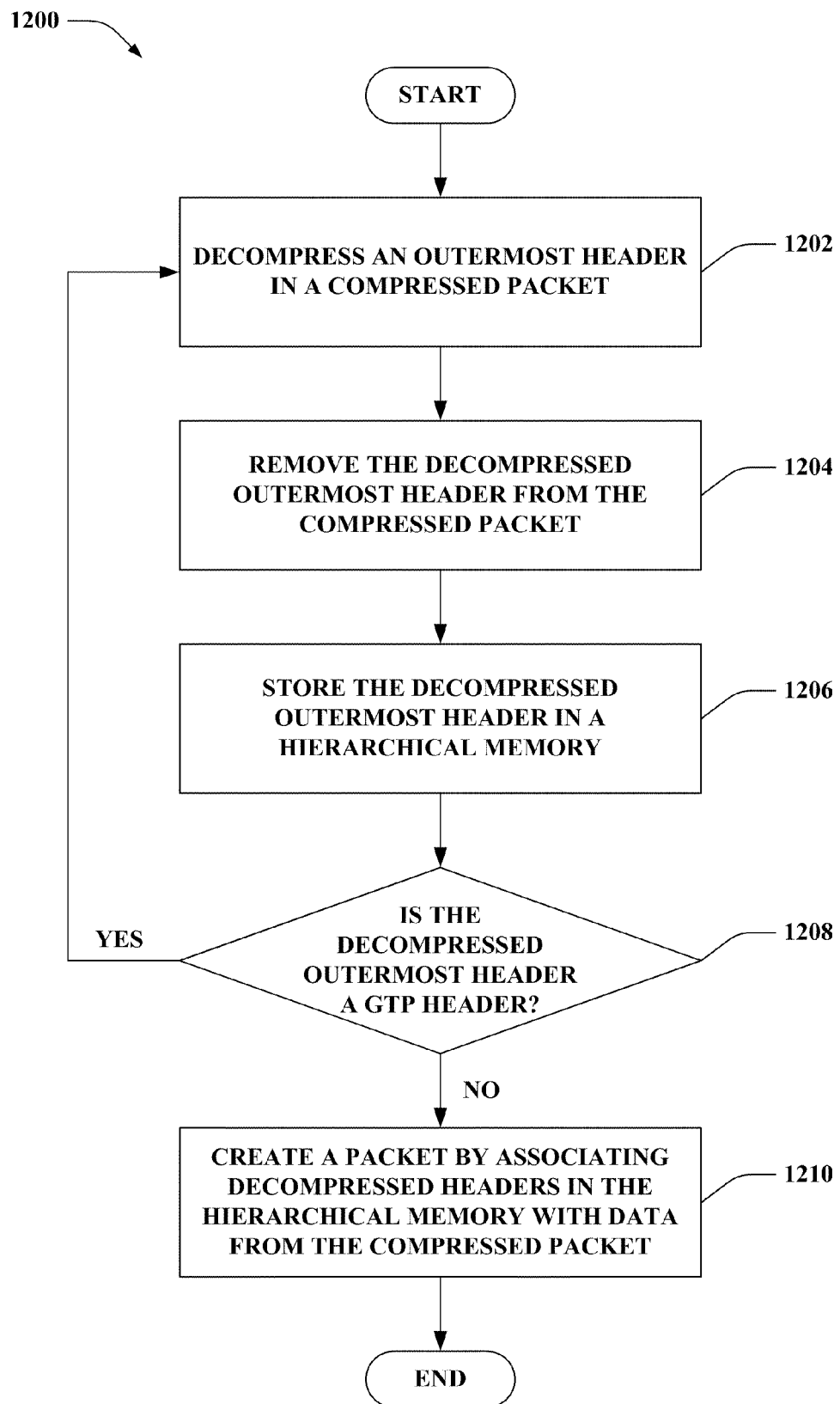
FIG. 12 is an illustration of an example methodology for recursively decompressing a plurality of packet headers.

Referring to FIG. 12, an example methodology 1200 is depicted that facilitates recursively decompressing headers of received compressed packets. At 1202, an outermost header of a compressed packet can be decompressed. As described, this can be a compressed packet received from a radio link control or similar layer that includes multiple headers for routing the compressed packet among relay nodes, for example. At 1204, the decompressed outermost header can be removed from the packet. Thus, the compressed packet can have one or more additional compressed headers that can be decompressed, in one example. At 1206, the decompressed outermost header can be stored in a hierarchical memory. For example, as described, the hierarchical memory can include a stack upon which the decompressed outermost header can be pushed. At 1208, it can be determined whether the decompressed outermost header is a GTP header. If so, the method 1200 can continue at 1202 where the next outermost header in the packet can be decompressed. If the outermost header is determined not to be a GTP header at 1208, then at 1210, a packet can be created by associating decompressed headers in the hierarchical memory with data from the compressed packet. Thus, as described, the compressed headers of the compressed packet can be decompressed and removed by recursively using a decompression context, which decompresses the outermost header of the packet. The removed decompressed headers can be reapplied to data in the packet to generate the packet. In this regard, existing decompression engines or contexts can be utilized without requiring modification to handle multiple compressed headers.

Figure 13:
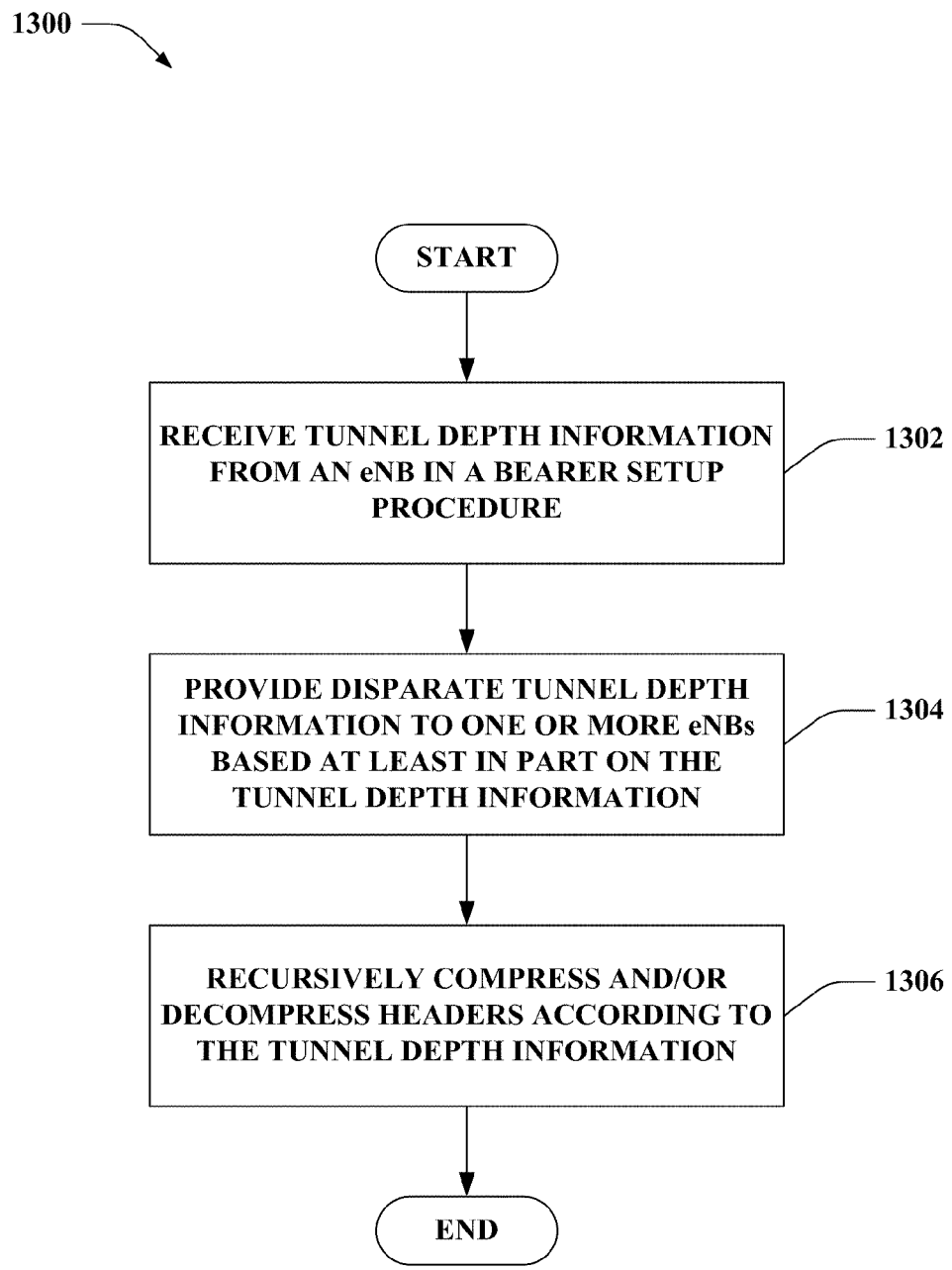
FIG. 13 is an illustration of an example methodology that recursively compresses/decompresses packets according to a received tunnel depth.

Now referring to FIG. 13, an example methodology 1300 that facilitates recursively compressing and decompressing headers based on received tunnel depth information is illustrated. At 1302, tunnel depth information can be received from an eNB in a bearer setup procedure. As described, this can include receiving a tunnel depth from a core network in a bearer setup request, from a downstream eNB in a request bearer modification message, from an upstream eNB in a RRC connection request message, and/or the like. At 1304, disparate tunnel depth information can be provided to one or more eNBs based at least in part on the tunnel depth information. For example, as described, a request bearer modification message can be forwarded to an upstream eNB including the tunnel depth information+1. In another example, a RRC connection request message can be forwarded to a downstream eNB with the tunnel depth information. At 1306, headers can be recursively compressed and/or decompressed according to the tunnel depth information.

It will be appreciated that, in accordance with one or more aspects described herein, inferences can be made regarding determining a compression context and/or profile thereof to utilize in compressing/decompressing packet headers, determining a profile type of a header, and/or other aspects described herein. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 14:
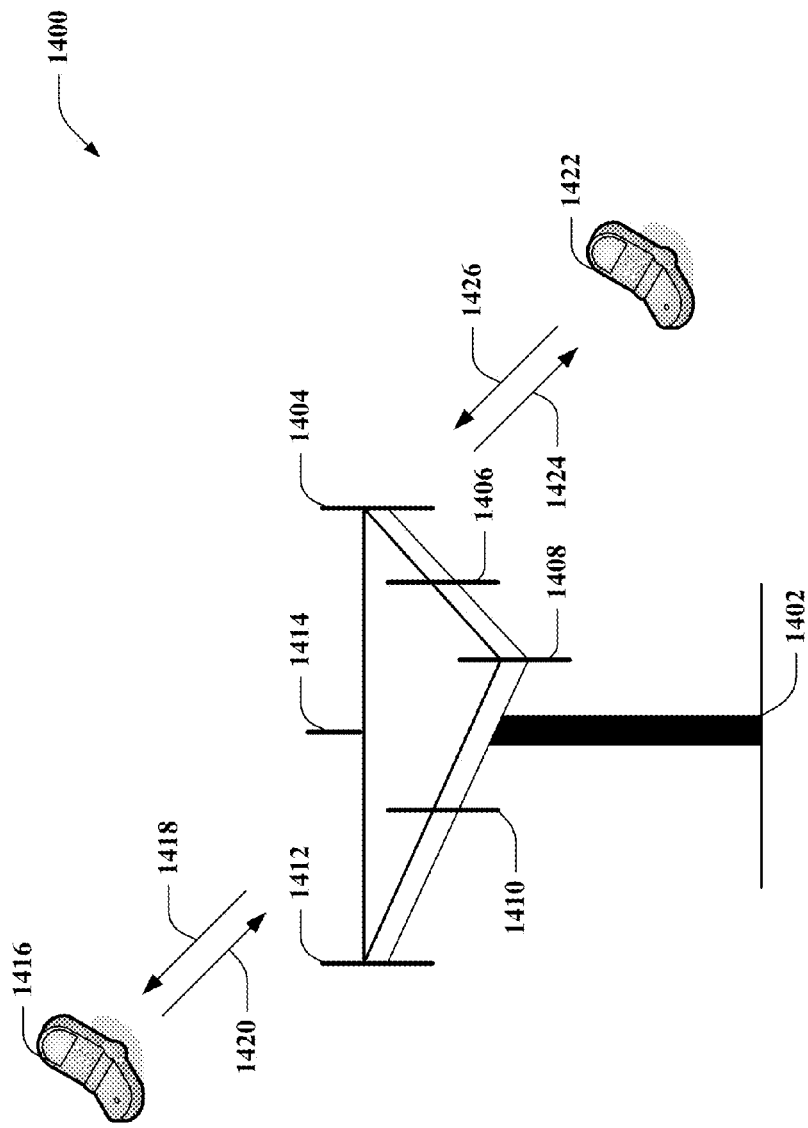
FIG. 14 is an illustration of a wireless communication system in accordance with various aspects set forth herein.

Referring now to FIG. 14, a wireless communication system 1400 is illustrated in accordance with various embodiments presented herein. System 1400 comprises a base station 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1402 can communicate with one or more mobile devices such as mobile device 1416 and mobile device 1422; however, it is to be appreciated that base station 1402 can communicate with substantially any number of mobile devices similar to mobile devices 1416 and 1422. Mobile devices 1416 and 1422 can be, for example, cellular phones, smart phones, laptops, handheld communication devices, handheld computing devices, satellite radios, global positioning systems, PDAs, and/or any other suitable device for communicating over wireless communication system 1400. As depicted, mobile device 1416 is in communication with antennas 1412 and 1414, where antennas 1412 and 1414 transmit information to mobile device 1416 over a forward link 1418 and receive information from mobile device 1416 over a reverse link 1420. Moreover, mobile device 1422 is in communication with antennas 1404 and 1406, where antennas 1404 and 1406 transmit information to mobile device 1422 over a forward link 1424 and receive information from mobile device 1422 over a reverse link 1426. In a frequency division duplex (FDD) system, forward link 1418 can utilize a different frequency band than that used by reverse link 1420, and forward link 1424 can employ a different frequency band than that employed by reverse link 1426, for example. Further, in a time division duplex (TDD) system, forward link 1418 and reverse link 1420 can utilize a common frequency band and forward link 1424 and reverse link 1426 can utilize a common frequency band.

Each group of antennas and/or the area in which they are designated to communicate can be referred to as a sector of base station 1402. For example, antenna groups can be designed to communicate to mobile devices in a sector of the areas covered by base station 1402. In communication over forward links 1418 and 1424, the transmitting antennas of base station 1402 can utilize beamforming to improve signal-to-noise ratio of forward links 1418 and 1424 for mobile devices 1416 and 1422. Also, while base station 1402 utilizes beamforming to transmit to mobile devices 1416 and 1422 scattered randomly through an associated coverage, mobile devices in neighboring cells can be subject to less interference as compared to a base station transmitting through a single antenna to all its mobile devices. Moreover, mobile devices 1416 and 1422 can communicate directly with one another using a peer-to-peer or ad hoc technology (not shown).

According to an example, system 1400 can be a multiple-input multiple-output (MIMO) communication system. Further, system 1400 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1402 can communicate to the mobile devices 1416 and 1422 over the channels, which can be create for various types of data. For example, channels can be created for communicating various types of general communication data, control data (e.g., quality information for other channels, acknowledgement indicators for data received over channels, interference information, reference signals, etc.), and/or the like.

Figure 15:
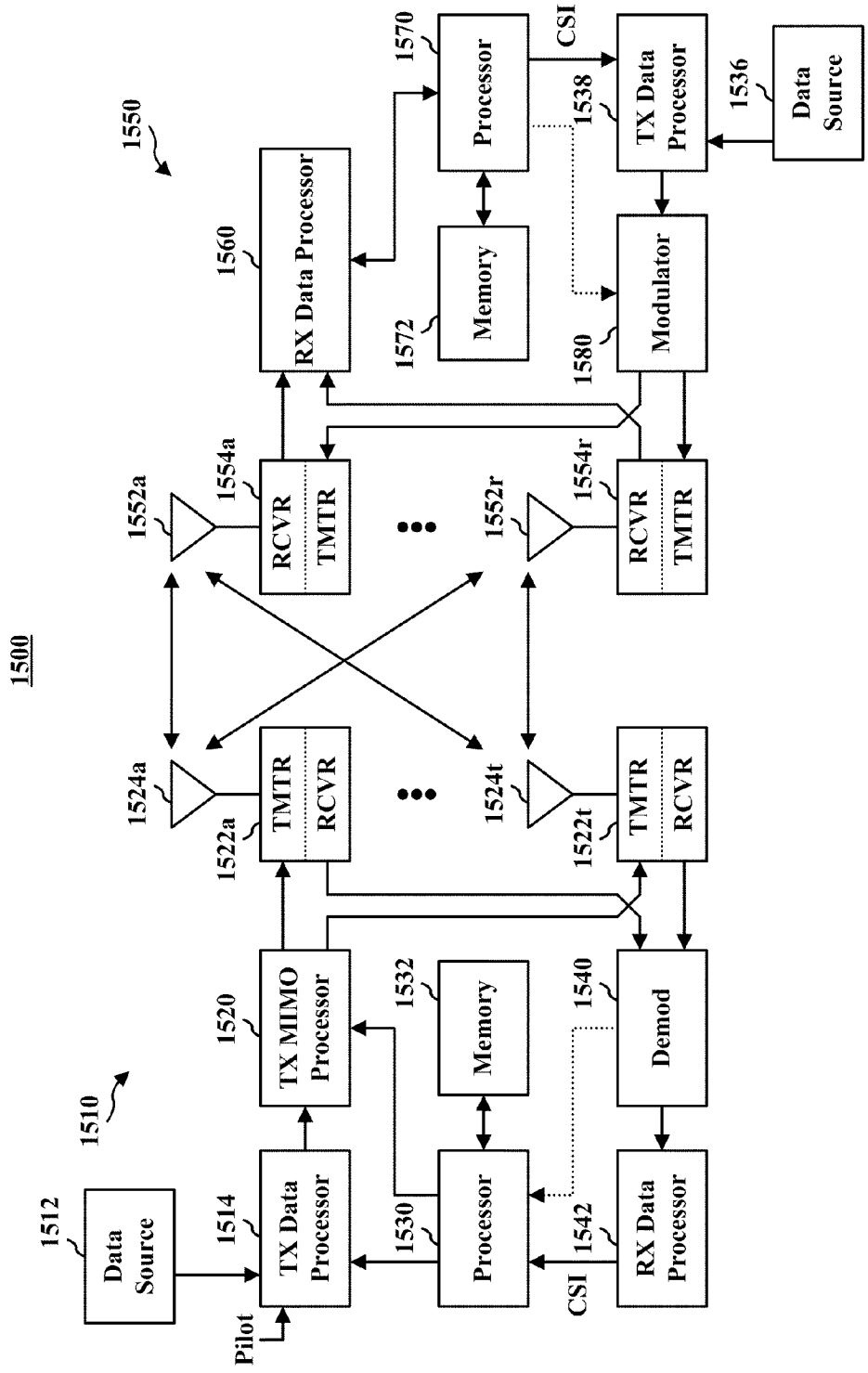
FIG. 15 is an illustration of an example wireless network environment that can be employed in conjunction with the various systems and methods described herein.

FIG. 15 shows an example wireless communication system 1500. The wireless communication system 1500 depicts one base station 1510 and one mobile device 1550 for sake of brevity. However, it is to be appreciated that system 1500 can include more than one base station and/or more than one mobile device, wherein additional base stations and/or mobile devices can be substantially similar or different from example base station 1510 and mobile device 1550 described below. In addition, it is to be appreciated that base station 1510 and/or mobile device 1550 can employ the systems (FIGS. 1-8 and 14) and/or methods (FIGS. 9-13) described herein to facilitate wireless communication therebetween.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various aspects, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At mobile device 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which precoding matrix to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from mobile device 1550 are received by antennas 1524, conditioned by receivers 1522, demodulated by a demodulator 1540, and processed by a RX data processor 1542 to extract the reverse link message transmitted by mobile device 1550. Further, processor 1530 can process the extracted message to determine which precoding matrix to use for determining the beamforming weights.

Processors 1530 and 1570 can direct (e.g., control, coordinate, manage, etc.) operation at base station 1510 and mobile device 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

Figure 16:
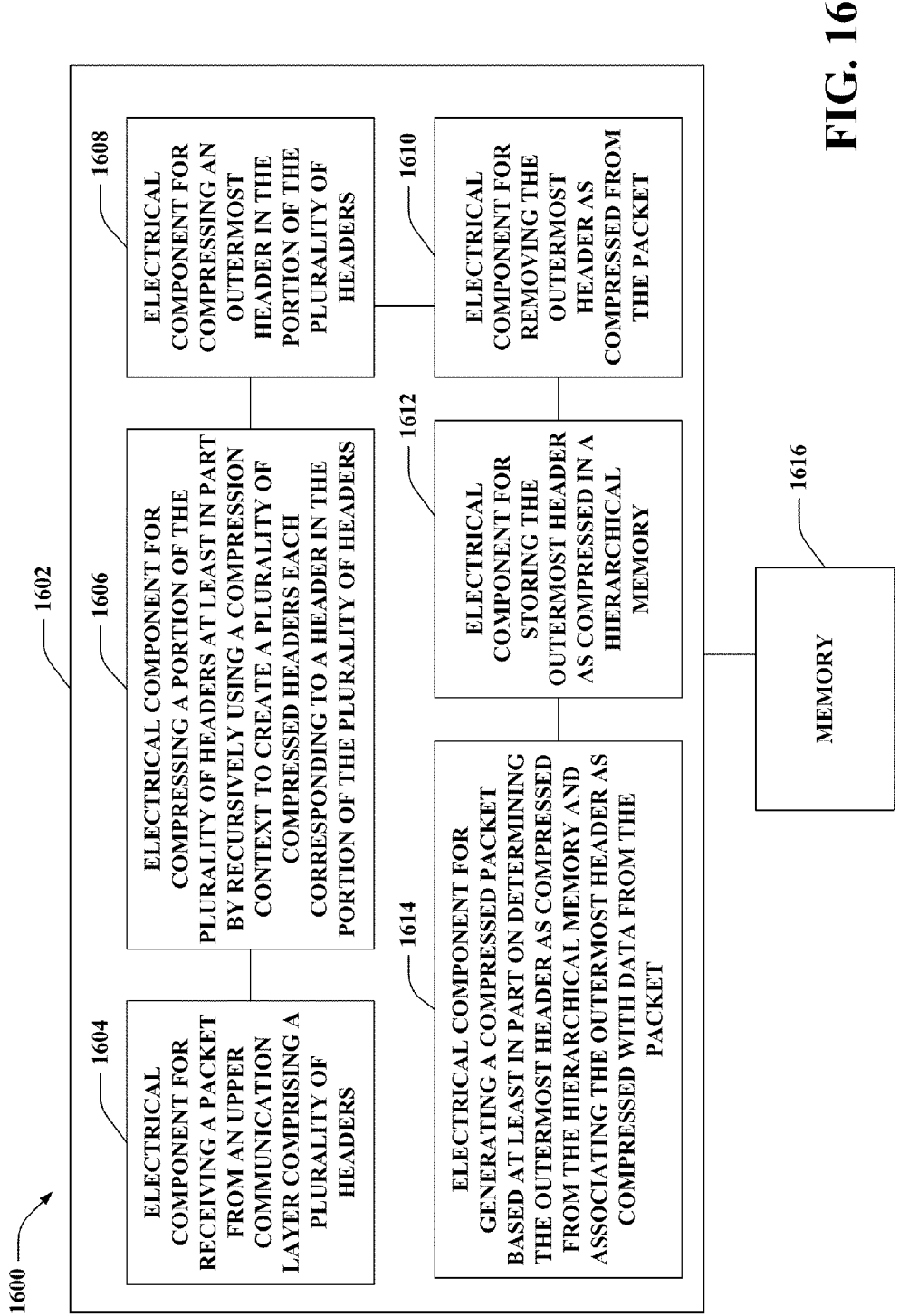
FIG. 16 is an illustration of an example system that recursively compresses a plurality of packet headers.

With reference to FIG. 16, illustrated is a system 1600 that facilitates recursively compressing packet headers. For example, system 1600 can reside at least partially within a base station, mobile device, etc. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for receiving a packet from an upper communication layer comprising a plurality of headers 1604. As described, for example, at least a portion of the plurality of headers can relate to routing the packet among various access points. Additionally, logical grouping 1602 can include an electrical component for compressing a portion of the plurality of headers at least in part by recursively using a compression context to create a plurality of compressed headers each corresponding to a header in the portion of the plurality of headers 1606. As described, this can include compressing headers until a header of a certain type is compressed, compressing headers according to a tunnel depth (e.g., received during a bearer setup procedure), compressing headers according to RoHC profiles for multiple headers, and/or the like, as described.

Moreover, logical grouping 1602 can include an electrical component for compressing an outermost header in the portion of the plurality of headers 1608. In addition, logical grouping 1602 can include an electrical component for removing the outermost header as compressed from the packet 1610, and an electrical component for storing the outermost header as compressed in a hierarchical memory 1612. In this regard, as described, electrical component 1608 can compress a next outermost header, electrical component 1610 can remove the header, and electrical component 1612 can store the header, for each of a number of headers, as described. Furthermore, logical grouping 1602 can include an electrical component for generating a compressed packet based at least in part on determining the outermost header as compressed from the hierarchical memory and associating the outermost header as compressed with data from the packet 1614. As described, electrical component 1614 can associate the outermost headers of the memory with the data until no headers are left in the memory. Additionally, system 1600 can include a memory 1616 that retains instructions for executing functions associated with electrical components 1604, 1606, 1608, 1610, 1612, and 1614. While shown as being external to memory 1616, it is to be understood that one or more of electrical components 1604, 1606, 1608, 1610, 1612, and 1614 can exist within memory 1616.

Figure 17:
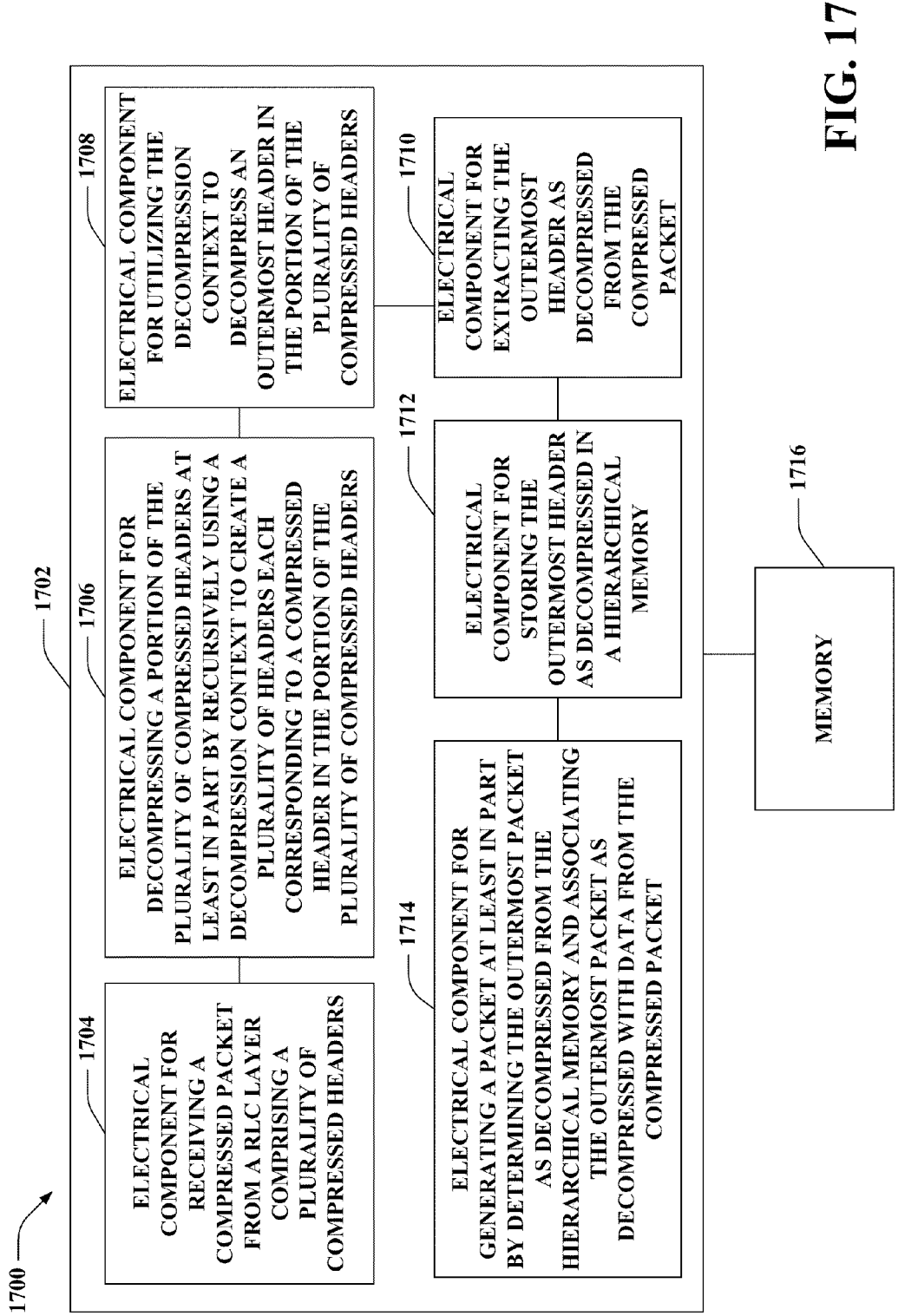
FIG. 17 is an illustration of an example system that recursively decompresses a plurality of packet headers.

With reference to FIG. 17, illustrated is a system 1700 that facilitates recursively decompressing packet headers. For example, system 1700 can reside at least partially within a base station, mobile device, etc. It is to be appreciated that system 1700 is represented as including functional blocks, which can be functional blocks that represent functions implemented by a processor, software, or combination thereof (e.g., firmware). System 1700 includes a logical grouping 1702 of electrical components that can act in conjunction. For instance, logical grouping 1702 can include an electrical component for receiving a compressed packet from an RLC layer comprising a plurality of compressed headers 1704. As described, for example, at least a portion of the plurality of compressed headers can relate to routing the packet among various access points. Additionally, logical grouping 1702 can include an electrical component for decompressing a portion of the plurality of compressed headers at least in part by recursively using a decompression context to create a plurality of headers each corresponding to a compressed header in the portion of the plurality of compressed headers 1706. As described, this can include decompressing headers until a header of a certain type is decompressed, decompressing headers according to a tunnel depth (e.g., received during a bearer setup procedure), decompressing headers according to RoHC profiles for multiple headers, and/or the like, as described.

Moreover, logical grouping 1702 can include an electrical component for utilizing the decompression context to decompress an outermost header in the portion of the plurality of compressed headers 1708. In addition, logical grouping 1702 can include an electrical component for extracting the outermost header as decompressed from the packet 1710, and an electrical component for storing the outermost header as decompressed in a hierarchical memory 1712. In this regard, as described, electrical component 1708 can decompress a next outermost header, electrical component 1710 can remove the header, and electrical component 1712 can store the header, for each of a number of headers, as described. Furthermore, logical grouping 1702 can include an electrical component for generating a packet based at least in part on determining the outermost header as decompressed from the hierarchical memory and associating the outermost header as decompressed with data from the compressed packet 1714. As described, electrical component 1714 can associate the outermost headers of the memory with the data until no headers are left in the memory. Additionally, system 1700 can include a memory 1716 that retains instructions for executing functions associated with electrical components 1704, 1706, 1708, 1710, 1712, and 1714. While shown as being external to memory 1716, it is to be understood that one or more of electrical components 1704, 1706, 1708, 1710, 1712, and 1714 can exist within memory 1716.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions, procedures, etc. may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
receiving a packet including a plurality of headers;
compressing a portion of the plurality of headers at least in part by recursively using a compression context to create a plurality of compressed headers each corresponding to a header in the portion of the plurality of headers;
utilizing the compression context to compress an outermost header in the portion of the plurality of headers;
removing the outermost header from the packet and storing the outermost header as compressed in a hierarchical memory;

determining the outermost header as compressed from the hierarchical memory; and generating a compressed packet at least in part by associating the outermost header as compressed with data in the packet; and providing the compressed packet comprising the plurality of compressed headers to a radio link control layer for transmission over a radio interface.

2. The method of claim 1, wherein the recursively using the compression context to create the plurality of compressed headers further includes utilizing the compression context to compress a next outermost header in the portion of the plurality of headers.

3. The method of claim 2, wherein the recursively using the compression context to create the plurality of compressed headers further includes removing the next outermost header from the packet and storing the next outermost header as compressed in the hierarchical memory.

4. The method of claim 3, wherein the recursively using the compression context to create the plurality of compressed headers further includes:

determining the next outermost header as compressed from the hierarchical memory; and generating the compressed packet at least in part by associating the outermost header as compressed and the next outermost header as compressed with data in the packet.

5. The method of claim 1, wherein the compressing the portion of the plurality of headers at least in part by recursively using the compression context includes recursively using a robust header compression (RoHC) context to create the plurality of compressed headers.

6. The method of claim 5, wherein the recursively using the RoHC context to create the plurality of compressed headers includes detecting a RoHC profile related to the portion of the plurality of headers and applying the RoHC context to a set of innermost headers in the portion of the plurality of headers based at least in part on the RoHC profile.

7. The method of claim 1, wherein the compressing the portion of the plurality of headers at least in part by recursively using the compression context includes recursively using the compression context to create the plurality of compressed headers according to a received tunnel depth.

8. The method of claim 7, further comprising providing the received tunnel depth or a modification of the received tunnel depth to an evolved Node B (eNB).

9. The method of claim 1, wherein the portion of the plurality of headers includes one or more general packet radio service tunneling protocol (GTP) headers.

10. The method of claim 1, wherein the compressed packet is at least a portion of a packet data convergence protocol data unit (PDCP PDU).

11. The method of claim 1, further comprising transmitting the compressed packet to a relay node.

12. A wireless communications apparatus, comprising:
at least one processor configured to:
obtain a packet from an upper communication layer comprising a plurality of headers;
recursively apply a compression context to the plurality of headers to create a plurality of compressed headers that each correspond to a header in the plurality of headers;
recursively apply the compression context to the plurality of headers at least in part by applying the compression context to an outermost header in a portion of the plurality of headers;

remove the outermost header as compressed from the packet and store the outermost header as compressed in a hierarchical memory; and create a compressed packet, at least in part by determining the outermost header as compressed from the hierarchical memory and associating the outermost header as compressed with the data from the packet, comprising the plurality of compressed headers along with data from the packet; and a memory coupled to the at least one processor.

13. The wireless communications apparatus of claim 12, wherein the at least one processor recursively applies the compression context to the plurality of headers at least in part by applying the compression context to a next outermost header in the portion of the plurality of headers.

14. The wireless communications apparatus of claim 13, wherein the at least one processor is further configured to remove the next outermost header as compressed from the packet and store the next outermost header as compressed in the hierarchical memory.

15. The wireless communications apparatus of claim 14, wherein the at least one processor creates the compressed packet at least in part by determining the outermost header as compressed and the next outermost header as compressed from the hierarchical memory and associating the outermost header as compressed and the next outermost header as compressed with the data from the packet.

16. The wireless communications apparatus of claim 12, wherein the compression context is a robust header compression (RoHC) context.

17. An apparatus, comprising:
means for receiving a packet from an upper communication layer comprising a plurality of headers;
means for compressing a portion of the plurality of headers at least in part by recursively using a compression context to create a plurality of compressed headers each corresponding to a header in the portion of the plurality of headers;
means for compressing an outermost header in the portion of the plurality of headers;
means for removing the outermost header as compressed from the packet;
means for storing the outermost header as compressed in a hierarchical memory; and
means for generating a compressed packet based at least in part on determining the outermost header as compressed from the hierarchical memory and associating the outermost header as compressed with data from the packet.

18. The apparatus of claim 17, wherein the means for receiving the packet provides the compressed packet to a radio link control layer.

19. The apparatus of claim 17, wherein the compression context is a robust header compression (RoHC) context.

20. A computer program product, comprising:
a non-transitory computer-readable medium comprising:
code for causing at least one computer to obtain a packet from an upper communication layer comprising a plurality of headers;
code for causing the at least one computer to recursively apply a compression context to the plurality of headers to create a plurality of compressed headers that each correspond to a header in the plurality of headers;
code for causing the at least one computer to apply the compression context to an outermost header in a portion of the plurality of headers;

code for causing the at least one computer to remove the outermost header as compressed from the packet and store the outermost header as compressed in a hierarchical memory;

code for causing the at least one computer to determine the outermost header as compressed from the hierarchical memory and associate the outermost header as compressed with the data from the packet; and code for causing the at least one computer to create a compressed packet comprising the plurality of compressed headers along with data from the packet.

21. The computer program product of claim 20, wherein the code for causing the at least one computer to recursively apply the compression context to the plurality of headers applies the compression context to a next outermost header in the portion of the plurality of headers.

22. The computer program product of claim 21, wherein the computer-readable medium further comprises code for causing the at least one computer to remove the next outermost header as compressed from the packet and store the next outermost header as compressed in the hierarchical memory.

23. The computer program product of claim 22, wherein the code for causing the at least one computer to create the compressed packet creates the compressed packet at least in part by determining the outermost header as compressed and the next outermost header as compressed from the hierarchical memory and associating the outermost header as compressed and the next outermost header as compressed with the data from the packet.

24. The computer program product of claim 20, wherein the compression context is a robust header compression (RoHC) context.

25. An apparatus, comprising:
a packet data convergence protocol (PDCP) layer processing component manufacture that receives a packet from an upper communication layer comprising a plurality of headers;
a header compressing component that compresses an outermost header in the portion of the plurality of headers using a compression context;
a compressed header removing component that extracts the outermost header as compressed from the packet;
a compressed header storing component that pushes the outermost header as compressed onto a hierarchical memory;
a compressed header concatenating component that generates a compressed packet at least in part by determining the outermost header as compressed from the hierarchical memory and associating the outermost header as compressed with data from the packet; and
a recursive compressing component that compresses a portion of the plurality of headers at least in part by recursively using a compression context to create a plurality of compressed headers each corresponding to a header in the portion of the plurality of headers.

26. The apparatus of claim 25, wherein the PDCP layer processing component provides the compressed packet to a radio link control layer.

27. The apparatus of claim 25, wherein the compression context is a robust header compression (RoHC) context.

28. A method, comprising:
receiving a compressed packet including a plurality of compressed headers;
decompressing a portion of the plurality of compressed headers at least in part by recursively using a decompression context to create a plurality of headers each corresponding to a compressed header in the portion of the plurality of compressed headers;
utilizing the decompression context to decompress an outermost header in the portion of the plurality of compressed headers;
removing the outermost header from the compressed packet and storing the outermost header as decompressed in a hierarchical memory;
determining the outermost header as decompressed from the hierarchical memory; and
generating a packet at least in part by associating the outermost header as decompressed with data in the compressed packet; and
providing the packet comprising the plurality of headers to an upper communication layer.

29. The method of claim 28, wherein the recursively using the decompression context to create the plurality of headers further includes utilizing the decompression context to decompress a next outermost header in the portion of the plurality of compressed headers.

30. The method of claim 29, wherein the recursively using the decompression context to create the plurality of headers further includes removing the next outermost header from the compressed packet and storing the next outermost header as decompressed in the hierarchical memory.

31. The method of claim 30, wherein the recursively using the decompression context to create the plurality of headers further includes:
determining the outermost header as decompressed and the next outermost header as decompressed from the hierarchical memory; and
generating the packet at least in part by associating the outermost header as decompressed and the next outermost header as decompressed with data in the compressed packet.

32. The method of claim 28, wherein the decompressing the portion of the plurality of compressed headers at least in part by recursively using the decompression context includes recursively using a robust header compression (RoHC) context to decompress the portion of the plurality of compressed headers.

33. The method of claim 28, wherein the recursively using the RoHC context to decompress the portion of the plurality of compressed headers includes detecting a RoHC profile related to the portion of the plurality of compressed headers and applying the RoHC context to a set of outermost headers in the portion of the plurality of compressed headers based at least in part on the RoHC profile.

34. The method of claim 28, wherein the decompressing the portion of the plurality of headers at least in part by recursively using the decompression context includes recursively using the decompression context to create the plurality of headers according to a tunnel depth received in a bearer setup procedure.

35. The method of claim 34, further comprising providing the tunnel depth or a modification of the tunnel depth to an eNB.

36. The method of claim 28, wherein the portion of the plurality of compressed headers includes one or more compressed GTP headers.

37. The method of claim 28, wherein the compressed packet is at least a portion of a PDCP PDU.

38. The method of claim 28, wherein the receiving the compressed packet includes receiving the compressed packet from radio link control layer.

39. A wireless communications apparatus, comprising:
  at least one processor configured to:
    obtain a compressed packet including a plurality of compressed headers;
    recursively apply a decompression context to a portion of the plurality of compressed headers to create a plurality of headers each corresponding to a compressed header in the portion of the plurality of compressed headers;
    apply the decompression context to an outermost header in the portion of the plurality of compressed headers;
    remove the outermost header from the compressed packet and store the outermost header as decompressed in a hierarchical memory;
    determine the outermost header as decompressed in the hierarchical memory and associate the outermost header as decompressed with the data from the compressed packet;
    create a packet comprising the plurality of compressed headers and data from the compressed packet; and
  a memory coupled to the at least one processor.

40. The wireless communications apparatus of claim 39, wherein the at least one processor recursively applies the decompression context at least in part by applying the decompression context to a next outermost header in the portion of the plurality of compressed headers.

41. The wireless communications apparatus of claim 40, wherein the at least one processor is further configured to remove the next outermost header from the compressed packet and store the next outermost header as decompressed in the hierarchical memory.

42. The wireless communications apparatus of claim 41, wherein the at least one processor creates the packet at least in part by determining the outermost header as decompressed and the next outermost header as decompressed in the hierarchical memory and associating the outermost header as decompressed and the next outermost header as decompressed with the data from the compressed packet.

43. The wireless communications apparatus of claim 39, wherein the decompression context is a robust header compression (RoHC) context.

44. An apparatus, comprising:
  means for receiving a compressed packet from a radio link control layer comprising a plurality of compressed headers;
  means for utilizing a decompression context to decompress an outermost header in the portion of the plurality of compressed headers;
  means for extracting an outermost header as decompressed from the compressed packet;
  means for storing the outermost header as decompressed in a hierarchical memory;
  means for generating a packet at least in part by determining the outermost header as decompressed from the hierarchical memory and associating the outermost header as decompressed with data from the compressed packet; and
  means for decompressing a portion of the plurality of compressed headers at least in part by recursively using the decompression context to create a plurality of headers each corresponding to a compressed header in the portion of the plurality of compressed headers.

45. The apparatus of claim 44, wherein the means for receiving the compressed packet communicates the packet to an upper communication layer.

46. The apparatus of claim 44, wherein the decompression context is a robust header compression (RoHC) context.

47. A computer program product, comprising:
  a non-transitory computer-readable medium comprising:
    code for causing at least one computer to obtain a compressed packet including a plurality of compressed headers;
    code for causing the at least one computer to recursively apply a decompression context to a portion of the plurality of compressed headers to create a plurality of headers each corresponding to a compressed header in the portion of the plurality of compressed headers;
    code for causing the at least one computer to recursively apply the decompression context to an outermost header in the portion of the plurality of compressed headers;
    code for causing the at least one computer to remove the outermost header from the compressed packet and store the outermost header as decompressed in a hierarchical memory;
    code for causing the at least one computer to create a packet at least in part by determining the outermost header as decompressed in the hierarchical memory and associating the outermost header as decompressed with the data from the compressed packet; and
    code for causing the at least one computer to create the packet comprising the plurality of compressed headers and data from the compressed packet.

48. The computer program product of claim 47, wherein the code for causing the at least one computer to recursively apply the decompression context applies the decompression context to a next outermost header in the portion of the plurality of compressed headers.

49. The computer program product of claim 48, wherein the computer-readable medium further comprises code for causing the at least one computer to remove the next outermost header from the compressed packet and store the next outermost header as decompressed in the hierarchical memory.

50. The computer program product of claim 49, wherein the code for causing the at least one computer to create the packet creates the packet at least in part by determining the outermost header as decompressed and the next outermost header as decompressed in the hierarchical memory and associating the outermost header as decompressed and the next outermost header as decompressed with the data from the compressed packet.

51. The computer program product of claim 47, wherein the decompression context is a robust header compression (RoHC) context.

52. An apparatus, comprising:
  a packet data convergence protocol (PDCP) layer processing component manufacture that receives a compressed packet from a radio link control layer comprising a plurality of compressed headers;
  a compressed header decompressing component that utilizes a decompression context to decompress an outermost header in the portion of the plurality of compressed headers;
  a header removing component that extracts the outermost header as decompressed from the compressed packet;
  a header storing component that pushes the outermost header as decompressed onto a hierarchical memory;
  a header concatenating component that generates a packet at least in part by determining the outermost header as decompressed from the hierarchical memory and associating the outermost header as decompressed with data from the compressed packet; and a recursive decompressing component that decompresses a portion of the plurality of compressed headers at least in part by recursively using the decompression context to create a plurality of headers each corresponding to a compressed header in the portion of the plurality of compressed headers.

53. The apparatus of claim 52, wherein the PDCP layer processing component communicates the packet to an upper communication layer.

54. The apparatus of claim 52, wherein the decompression context is a robust header compression (RoHC) context.

\* \* \* \* \*